(12) United States Patent
Mei et al.

(10) Patent No.: US 11,124,601 B2
(45) Date of Patent: *Sep. 21, 2021

(54) ELECTROCHROMIC POLYMER AND SYNTHESIS AND USES THEREOF

(71) Applicant: Furcifer Inc., Fremont, CA (US)

(72) Inventors: Jianguo Mei, West Lafayette, IN (US); Jiazhi He, Lafayette, IN (US); Yan Zhou, Fremont, CA (US)

(73) Assignee: Furcifer Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/718,600

(22) Filed: Dec. 18, 2019

(65) Prior Publication Data

US 2020/0123313 A1    Apr. 23, 2020

Related U.S. Application Data

(63) Continuation of application No. 16/033,012, filed on Jul. 11, 2018, now Pat. No. 10,550,221.
(Continued)

(51) Int. Cl.
*C08G 61/12* (2006.01)
*G02F 1/155* (2006.01)
(Continued)

(52) U.S. Cl.
CPC .............. *C08G 61/126* (2013.01); *C09K 9/02* (2013.01); *G02F 1/155* (2013.01); *C08G 61/123* (2013.01); *C08G 2261/12* (2013.01); *C08G 2261/122* (2013.01); *C08G 2261/1424* (2013.01); *C08G 2261/228* (2013.01); *C08G 2261/312* (2013.01);
(Continued)

(58) Field of Classification Search
CPC ...... C08G 1/123; C08G 1/126; C08G 61/126; C08G 2261/12; C08G 2261/228; C08G 2261/312; C08G 2261/314; C08G 2261/3246; C08G 2261/3243; C08G 2261/3241; C08G 2261/3242; C08G 2261/54; C09K 9/02; C09K 2211/1491; C09K 2211/1483; C09K 2211/1458;
(Continued)

(56) References Cited

U.S. PATENT DOCUMENTS

| 8,383,761 B2 | 2/2013 | Beaujuge et al. |
| 2016/0244553 A1 | 8/2016 | Reynolds et al. |

FOREIGN PATENT DOCUMENTS

| WO | 2014/205024 A1 | 12/2014 |
| WO | 2015/179789 A1 | 11/2015 |

OTHER PUBLICATIONS

Liu et al., "Solution-processable thiophene-based electrochromic polymers bearing trifluoromethyl rather than long side chains," Organic Electronics, 2016, vol. 37, p. 169-177.
(Continued)

*Primary Examiner* — Shane Fang

(57) ABSTRACT

Black-to-transmissive electrochromic polymers have superior properties such as absorbance of across the entire visible spectrum and an obvious color change from black to transmissive with an applied voltage. Methods for synthesizing or using the same include contacting monomers under polymerization conditions. Black-to-transmissive electrochromic polymer thin films include the black-to-transmissive electrochromic polymers, and electrochromic devices include the black-to-transmissive electrochromic polymers or thin films.

12 Claims, 6 Drawing Sheets

Related U.S. Application Data

(60) Provisional application No. 62/532,693, filed on Jul. 14, 2017.

(51) Int. Cl.
   *C09K 9/02* (2006.01)
   *G02F 1/1516* (2019.01)

(52) U.S. Cl.
   CPC .......... *C08G 2261/314* (2013.01); *C08G 2261/3142* (2013.01); *C08G 2261/3223* (2013.01); *C08G 2261/3241* (2013.01); *C08G 2261/3242* (2013.01); *C08G 2261/3243* (2013.01); *C08G 2261/3246* (2013.01); *C08G 2261/41* (2013.01); *C08G 2261/54* (2013.01); *C09K 2211/145* (2013.01); *C09K 2211/1416* (2013.01); *C09K 2211/1425* (2013.01); *C09K 2211/1458* (2013.01); *C09K 2211/1466* (2013.01); *C09K 2211/1483* (2013.01); *G02F 1/15165* (2019.01)

(58) Field of Classification Search
   CPC ...... C09K 2211/1466; C09K 2211/145; C09K 2211/1425; C09K 2211/1416
   See application file for complete search history.

(56) References Cited

OTHER PUBLICATIONS

Beaujuge et al., "The donor-acceptor approach allows a black-to-transmissive switching polymeric electrochrome," Nature Materials, 2008, vol. 7, p. 795-799.

Xie et al., "The optimization of donor-to-acceptor feed ratios with the aim of obtaining black-to-transmissive switching polymers based on isoindigo as the electron-deficient moiety," RSC Advances, 2017, vol. 7, p. 11840-11851.

International Search Report and Written Opinion for Application No. PCT/US2018/041681, dated Nov. 9, 2018, 10 pages.

Huang et al., "The Influence of Charge Trapping on the Electrochromic Performance of Poly (3,4~alkylenedioxythiophene) Derivatives," Applied Materials & Interfaces, 2010, vol. 2, No. 2, p. 351-359.

Kim et al., "Solution Processable and Patternable Poly(3,4-alkylenedioxythiophenes) for Large-Area Electrochromic Films," Advanced Materials, 2011, vol. 23, p. 4168-4173.

Search Report issued in European Application No. 18832823.1, dated Mar. 26, 2021, 6 pages.

Shi et al., "Broadly Absorbing Black to Transmissive Switching Electrochromic Polymers", Advanced Materials, 2010, vol. 22, pp. 4949-4953.

ELECTROCHROMIC POLYMER AND SYNTHESIS AND USES THEREOF

CROSS-REFERENCE TO RELATED APPLICATION

This application is a continuation application of U.S. application Ser. No. 16/033,012, now allowed, filed on Jul. 11, 2018, which is based on and claims priority to U.S. Provisional Application No. 62/532,693, filed Jul. 14, 2017, entitled "Method for synthesizing electrochromic polymer thin films." The entire contents of the above-referenced application are all incorporated herein by reference.

TECHNICAL FIELD

The disclosure relates generally to electrochromic polymer thin films, and more particularly, to black-to-transmissive electrochromic polymer thin films with a high optical contrast and a fast switch, and methods of using and making the same.

BACKGROUND

Electrochromism refers to a reversible optical spectrum change upon an electron transfer reaction induced via an application of voltage. Recently, electrochromic (EC) materials play an increasingly vital role in both academic and practical areas since it achieves a reversible and highly stable variation of transmissive/absorptive spectra and tunable colors between doped and undoped states, and hence possesses a great potential to be used in smart windows mirror, sunglasses, digital signage and displays, as well as electronic paper.

Among various EC material candidates, inorganic materials such as (transition) metal oxides and their complexes are the most widely exploited color-changing materials due to broad polaron absorption and high photochemistry, nevertheless, always limited by a slow respond time and low coloration efficiency. A polaron is a quasiparticle used to understand interactions between electrons and atoms in a solid material. A photochemistry refers to a chemical reaction caused by absorption of light. Alternatively, conjugated polymers have been recognized as desired materials in all sorts of electrochromic devices (ECDs) for their tunable colors, high optical contrast, easy processability, and long-term stability. Currently, many investigations have been devoted into the various saturated colored-to-transmissive polymeric ECDs from their neutral states to doped states. Especially, black-to-transmissive electrochromic polymers (ECPs) is gradually becoming a hot spot as it is signified to be a promising material for privacy glass and smart windows. However, there still remains a challenge due to complexity and incompleteness of absorption over the whole visible spectrum in the neutral state, followed by bleaching out in a fully oxidized state.

Up to now, significant efforts have been devoted to design and obtain a desired black color and a full spectrum, and various materials and strategies are emerging. As mentioned, although metal oxides and their complex, such as porous NiO, Co-based polymer, $CuO_2$, $IrO_2$ have been extensively investigated and can be served as the black-to-transmissive electrochromes, they show inferior EC performances (low coloration efficiency and slow color change) compared with organic polymer materials.

Organic black-to-transmissive EC materials include (1) individual copolymers absorbing the entire visible spectrum, and (2) complementary compositions based on "color-mixing" theory to achieve a complete spectrum and a black-to-transmissive EC display. When two or more different monomers unite together to polymerize, their result is called a copolymer and its process is called copolymerization. Various sorts of black-to-transmissive ECDs are reported with the second method by blending multicolored compounds or constructing complementary multilayers. Consequently cathodically coloring layer EC materials can potentially complement an anodically coloring electrode to form a panchromatic absorption spectrum within the visible spectrum. However, the resulting colors obtained by this method show a relatively low optical contrast, complex process, or pseudo-color phenomenon. Also, performance and manipulation limitations seriously limit the applications in a narrow range.

Initiated by others works on the design and synthesis of conjugated ECPs with neutral state colors of blue, green or black, band gaps of these materials must be lower than 1.75 eV. To construct a low-band gap system, a "donor-acceptor" (D-A) strategy via alternating electron-donating and electron-accepting (i.e., electron-rich and electron-deficient) units, is verified as an effective solution and has been widely employed to synthesize individual copolymers. Nevertheless, the band gap is not the only factor in determination of a color state. A color state is a comprehensive result of wavelengths and intensities with different optical transitions. More importantly, there are multiple absorption spectra with various breadths existing in the D-A copolymers structure. The first neutral-state black-to-transmissive polymeric electrochrome was proposed and developed by Reynolds group (P. M. Beaujuge, S. Ellinger, J. R. Reynolds, the donor-acceptor approach allows a black-to-transmissive switching polymeric electrochrome, *Nat. Mater.* 2008, 7, 795-799). Then they made further improvements and investigated several kinds of copolymers in lower fabrication and processing costs, as well as good performance, exhibiting fast switching responds, high optical contrast. Nevertheless, additional improvements are still required for more uniform and broad absorbance across the entire visible spectrum to meet needs of the applications.

SUMMARY

This disclosure presents individual black-to-transmissive electrochromic copolymers which absorb over the entire visible spectrum, and methods of preparing the copolymers as well as their uses in ECDs.

One aspect of the present disclosure is directed to a black-to-transmissive electrochromic polymer having more uniform and broad absorbance across the entire visible spectrum. In some embodiments, the black-to-transmissive electrochromic polymer is of Formula (I):

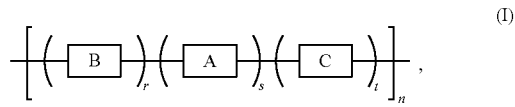

wherein

[A] is of the formula

[B] of the formula

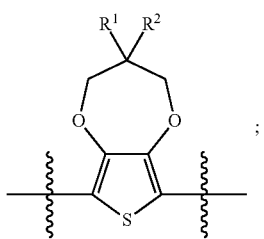

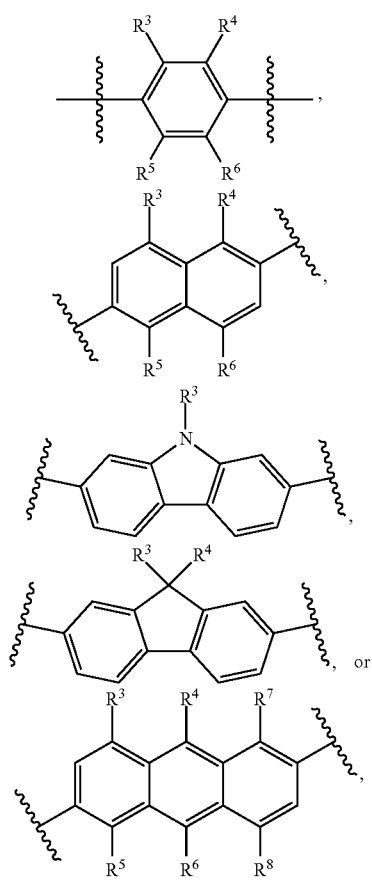

or a combination thereof;
[C] of the formula

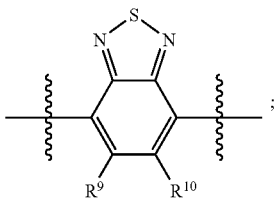

each of $R^1$, $R^2$, $R^3$, $R^4$, $R^5$, $R^6$, $R^7$, $R^8$, $R^9$, and $R^{10}$ is independently hydrogen, optionally substituted $C_1$-$C_{30}$ alkyl, optionally substituted $C_2$-$C_{30}$ alkenyl, optionally substituted $C_2$-$C_{30}$ alkynyl, optionally substituted $C_2$-$C_{30}$ alkylcarbonyl, optionally substituted $C_1$-$C_{30}$ alkoxy, optionally substituted $C_3$-$C_{30}$ alkoxyalkyl, optionally substituted $C_2$-$C_{30}$ alkoxycarbonyl, optionally substituted $C_4$-$C_{30}$ alkoxycarbonylalkyl, optionally substituted $C_1$-$C_{30}$ aminylcarbonyl, optionally substituted $C_4$-$C_{30}$ aminylalkyl, optionally substituted $C_1$-$C_{30}$ alkylaminyl, optionally substituted $C_1$-$C_{30}$ alkyl sulfonyl, optionally substituted $C_3$-$C_{30}$ alkylsulfonylalkyl, optionally substituted $C_6$-$C_{18}$ aryl, optionally substituted $C_3$-$C_{15}$ cycloalkyl, optionally substituted $C_3$-$C_{30}$ cycloalkylaminyl, optionally substituted $C_5$-$C_{30}$ cycloalkylalkylaminyl, optionally substituted $C_5$-$C_{30}$ cycloalkylalkyl, optionally substituted $C_5$-$C_{30}$ cycloalkylalkyloxy, optionally substituted $C_1$-$C_{12}$ heterocyclyl, optionally substituted $C_1$-$C_{12}$ heterocyclyloxy, optionally substituted $C_3$-$C_{30}$ heterocyclylalkyloxy, optionally substituted $C_1$-$C_{30}$ heterocyclylalkyloxy, optionally substituted $C_1$-$C_{30}$ heterocyclylaminyl, optionally substituted $C_5$-$C_{30}$ heterocyclylalkylaminyl, optionally substituted $C_2$-$C_{12}$ heterocyclylcarbonyl, optionally substituted $C_3$-$C_{30}$ heterocyclylalkyl, optionally substituted $C_1$-$C_{13}$ heteroaryl, or optionally substituted $C_3$-$C_{30}$ heteroarylalkyl;

each r, s and t is independently an integer of equal to or greater than 1;

n is an integer of equal to or greater than 1;

{ represents connection to the rest of the molecule; and the average ratio of [B], [A], and [C] in the polymer is x:y:z, wherein x ranges from about 0.2 to about 0.6, y ranges from about 1.2 to about 1.45, and z ranges from about 0.2 to about 0.45, and x+y+z=2.

Another aspect of the present disclosure is directed to a black-to-transmissive electrochromic polymer. The synthesized black polymer may absorb across the entire visible spectrum and realize an obvious color change from black (e.g., L*=49.2, a*=−10~5, b*=−10~5, such as a*=3.6, b*=−7.7) to transmissive (e.g., L*=85, a*=−10~5, b*=−10~5, such as a*=−4.6, b*=−5.8) with an applied voltage of 0-1.2 V. An optical contrast as high as nearly 70% may be achieved within 10 seconds in electrochromic thin films made of the black polymer.

Another aspect of the present disclosure is directed to a method for synthesizing a black-to-transmissive electrochromic polymer via controlling monomer feed ratios in a direct arylation polymerization. In some embodiments, to synthesize the black polymer, with 1.0 equivalent of monomer 1, the feed ratios of monomers 2, 3 and 4 may range from 0.2-0.6, 0.2-0.45, 0.2-0.35, respectively, wherein monomers 1, 2, 3 and 4 are as described herein.

Another aspect of the present disclosure is directed to electrochromic thin films made of the black polymer, and a black-to-transmissive ECD based on the as-prepared electrochromic films may be designed using a transparent indium tin oxide (ITO) as a counter electrode for charge storage. The ECD may display high contrasts for 43.6%, switching from a saturated black state (L*=37.8, a*=−5~0, b*=−10~0, such as a*=2.5, b*=−6.4) to a transmissive state (L*=72.6, a*=−5~0, b*=−5~0, such as a*=−8.0, b*=−6.5).

It is to be understood that the foregoing general description and the following detailed description are exemplary and explanatory only, and are not restrictive of the disclosure, as claimed.

BRIEF DESCRIPTION OF THE DRAWINGS

The accompanying drawings, which constitute a part of this disclosure, illustrate several non-limiting embodiments and, together with the description, serve to explain the disclosed principles.

DETAILED DESCRIPTION OF THE EMBODIMENTS

Figure 1:
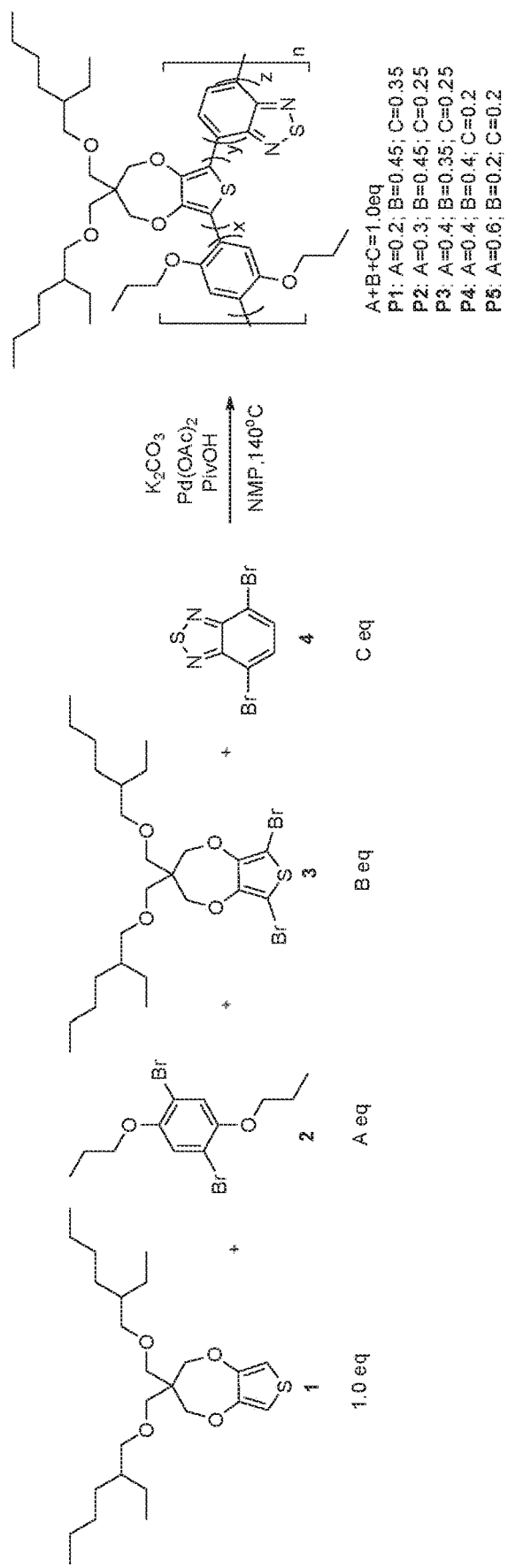
FIG. 1 is a graphical diagram illustrating a reaction scheme for a synthesis of black polymers, consistent with exemplary embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present disclosure do not represent all implementations consistent with the disclosure. Instead, they are merely examples of systems and methods consistent with aspects related to the disclosure.

As used herein, the term "comprising" is intended to mean that the compositions and methods include the recited elements, but not excluding others. "Consisting essentially of" when used to define compositions and methods, shall mean excluding other elements of any essential significance to the combination. For example, a composition consisting essentially of the elements as defined herein would not exclude other elements that do not materially affect the basic and novel characteristic(s) of the claimed invention." Consisting of shall mean excluding more than trace amount of other ingredients and substantial method steps recited. Embodiments defined by each of these transition terms are within the scope of this invention.

Numeric ranges are also inclusive of the numbers defining the range. Additionally, the singular forms "a", "an" and "the" include plural referents unless the context clearly dictates otherwise.

Reference throughout this specification to "one embodiment," "an embodiment" or "some embodiments" means that a particular feature, structure or characteristic described in connection with the embodiment is included in at least one embodiment of the present invention. Thus, the appearances of the phrases "in one embodiment," "in an embodiment" or "in some embodiments" in various places throughout this specification are not necessarily all referring to the same embodiment or embodiments, but may be in some instances. Furthermore, the particular features, structures, or characteristics may be combined in any suitable manner in one or more embodiments.

The term "about" when used before a numerical value indicates that the value may vary within reasonable range, such as ±10%, ±5%, and ±1%.

Unless defined otherwise, all technical and scientific terms used herein have the same meaning as is commonly understood by one of skill in the art to which this invention belongs. For instance, "amino" refers to the —NH$_2$ radical; "hydroxy" or "hydroxyl" refers to the OH radical; "thioxo" refers to the =S substituent, etc.

Alkyl" refers to a straight or branched hydrocarbon chain radical consisting solely of carbon (C) and hydrogen (H) atoms, which is saturated or unsaturated (i.e., contains one or more double and/or triple bonds), having from 1 to 30 carbon atoms ($C_1$-$C_{30}$ alkyl), and which is attached to the rest of the molecule by a single bond, e.g., methyl, ethyl, n-propyl, 1-methylethyl (iso-propyl), n-butyl, n-pentyl, 1,1-dimethylethyl (t-butyl), 3-methylhexyl, 2-methylhexyl, ethenyl, prop-1-enyl, but-1-enyl, pent-1-enyl, penta-1,4-dienyl, ethynyl, propynyl, butynyl, pentynyl, hexynyl, and the like. Unless stated otherwise specifically in the specification, an alkyl group may be optionally substituted.

"Alkylene" or "alkylene chain" refers to a straight or branched divalent hydrocarbon chain linking the rest of the molecule to a radical group, consisting solely of carbon and hydrogen, which is saturated or unsaturated (i.e., contains one or more double and/or triple bonds), and having from 2 to 30 carbon atoms ($C_2$-$C_{30}$ alkylene), e.g., methylene, ethylene, propylene, n-butylene, ethenylene, propenylene, n-butenylene, propynylene, n-butynylene, and the like. The alkylene chain is attached to the rest of the molecule through a single or double bond and to the radical group through a single or double bond. The points of attachment of the alkylene chain to the rest of the molecule and to the radical group can be through one carbon or any two carbons within the chain. Unless stated otherwise specifically in the specification, an alkylene chain may be optionally substituted.

"Alkylcarbonyl" refers to a radical of the formula —(C=O)$R^a$ where $R^a$ is a $C_1$-$C_{30}$ alkyl radical as defined above. Unless stated otherwise specifically in the specification, an alkylcarbonyl group may be optionally substituted.

"Alkoxy" refers to a radical of the formula —OR' where $R^a$ is a $C_1$-$C_{30}$ alkyl radical as defined above. A "haloalkoxy" is an alkoxy group as defined above, wherein at least one carbon-hydrogen bond is replaced with a carbon-halogen bond. Unless stated otherwise specifically in the specification, an alkoxy or haloalkoxy group may be optionally substituted.

"Alkoxyalkyl" refers to a radical of the formula —$R^b$O$R^a$ where $R^a$ is a $C_1$-$C_{30}$ alkyl radical as defined above, and $R^b$ is a $C_2$-$C_{30}$ alkylene radical as defined above. A "haloalkoxyalkyl" group is an alkoxyalkyl, wherein at least one carbon-hydrogen bond is replaced with a carbon-halogen bond. Unless stated otherwise specifically in the specification, an alkoxyalkyl or haloalkoxyalkyl group may be optionally substituted.

"Alkoxycarbonyl" refers to a radical of the formula —(C=O)O$R^a$ where $R^a$ is a $C_1$-$C_{30}$ alkyl radical as defined above. Unless stated otherwise specifically in the specification, an alkoxycarbonyl group may be optionally substituted.

"Alkoxycarbonylalkyl" refers to a radical of the formula —$R^b$(C=O)O$R^a$ where $R^a$ is a $C_1$-$C_{30}$ alkyl radical as defined above, and $R^b$ is a $C_2$-$C_{30}$ alkylene as defined above. Unless stated otherwise specifically in the specification, an alkoxycarbonylalkyl group may be optionally substituted.

"Aminylcarbonyl" refers to a radical of the formula —C(=O)N($R^a$)$_2$, where each $R^a$ is independently H or a $C_1$-$C_{30}$ alkyl group as defined above. Unless stated otherwise specifically in the specification, an aminylcarbonyl group may be optionally substituted.

"Aminylalkyl" refers to a radical of the formula —$R^a$N($R^b$)$_2$ where $R^a$ is a $C_2$-$C_{30}$ alkylene as defined above, and each $R^b$ is independently a $C_1$-$C_{30}$ alkyl radical as defined above. Unless stated otherwise specifically in the specification, an aminylalky group may be optionally substituted.

"Alkylaminyl" refers to a radical of the formula —NH$R^a$ or —N$R^a R^a$ where each $R^a$ is independently a $C_1$-$C_{30}$ alkyl radical as defined above, and $R^a$ is a $C_1$-$C_{30}$ alky radical as defined above. Unless stated otherwise specifically in the specification, an aminylalky group may be optionally substituted.

"Alkylsulfonyl" refers to a radical of the formula —S(O)$_2 R^a$ where $R^a$ is a $C_1$-$C_{30}$ alkyl radical as defined above. Unless stated otherwise specifically in the specification, an alkylsulfonyl group may be optionally substituted.

"Alkylsulfonylalkyl" refers to a radical of the formula —$R^b$S(O)$_2 R^a$ where $R^a$ is a $C_1$-$C_{30}$ alkyl radical as defined above, and $R^b$ is a $C_2$-$C_{30}$ alkylene radical as defined above. Unless stated otherwise specifically in the specification, an alkylsulfonylalkyl group may be optionally substituted.

"Cyanoalkyl" is a $C_1$-$C_{30}$ alkyl group as defined above, wherein at least one carbon-hydrogen bond is replaced with a carbon-cyano bond. Unless stated otherwise specifically in the specification, a cyanoalkyl group may be optionally substituted.

"Hydroxylalkyl" refers to a $C_1$-$C_{30}$ alkyl radical as defined above, which has been substituted by one or more hydroxyl groups. Unless stated otherwise specifically in the specification, a hydroxylalkyl group may be optionally substituted.

"Aryl" refers to a hydrocarbon ring system radical comprising hydrogen, 6 to 18 carbon atoms and at least one aromatic ring. For purposes of this invention, the aryl radical may be a monocyclic, bicyclic, tricyclic or tetracyclic ring system, which may include fused or bridged ring systems. Aryl radicals include, but are not limited to, aryl radicals derived from phenyl, naphthyl, anthryl, etc. Unless stated otherwise specifically in the specification, the term "aryl" is meant to include aryl radicals that are optionally substituted.

"Conjugated polymer" refers to a polymer having alternating single and double (or triple) carbon-carbon bonds along at least a portion of the polymer backbone.

"Cycloalkyl" or "carbocyclic ring" refers to a stable non-aromatic monocyclic or polycyclic hydrocarbon radical consisting solely of carbon and hydrogen atoms, which may include fused or bridged ring systems, having from 3 to 15 carbon atoms, and which is saturated or unsaturated and attached to the rest of the molecule by a single bond. Monocyclic radicals may include, but are not limited to, cyclopropyl, cyclobutyl, cyclopentyl, cyclohexyl, cycloheptyl, and cyclooctyl. Polycyclic radicals may include, but are not limited to, adamantyl, norbornyl, decalinyl, 7,7-dimethyl-bicyclo[2.2.1]heptanyl, and the like. Unless otherwise stated specifically in the specification, a cycloalkyl group may be optionally substituted.

"Cycloalkylaminyl" refers to a radical of the formula —N$R^a R^c$ where $R^a$ is, independently, H or a $C_1$-$C_{30}$ alkyl radical as defined above, and $R^c$ is a $C_3$-$C_{15}$ cycloalkyl radical as defined above. Unless stated otherwise specifically in the specification, an aminylalky group may be optionally substituted.

"Cycloalkylalkylaminyl" refers to a radical of the formula —N$R^a R^b$—$R^c$ where $R^a$ is independently H or a $C_1$-$C_{30}$ alkyl radical as defined above, $R^b$ is a $C_2$-$C_{30}$ alkylene radical as defined above, and $R^c$ is a $C_3$-$C_{15}$ cycloalkyl radical as defined above. Unless stated otherwise specifically in the specification, a cycloalkylalkylaminyl group may be optionally substituted.

"Cycloalkylalkyl" refers to a radical of the formula —$R^b R^c$ where $R^b$ is a $C_2$-$C_{30}$ alkylene chain as defined above, and $R^c$ is a $C_3$-$C_{15}$ cycloalkyl radical as defined above. Unless stated otherwise specifically in the specification, a cycloalkylalkyl group may be optionally substituted.

"Cycloalkylalkyloxy" refers to a radical of the formula —O$R^b R^c$ where $R^b$ is a $C_2$-$C_{30}$ alkylene chain as defined above, and $R^c$ is a $C_3$-$C_{15}$ cycloalkyl radical as defined above. Unless stated otherwise specifically in the specification, a cycloalkylalkyloxy group may be optionally substituted.

"Fused" refers to any ring structure described herein which is fused to an existing ring structure in the compounds of the invention. When the fused ring is a heterocyclyl ring or a heteroaryl ring, any carbon atom on the existing ring structure which becomes part of the fused heterocyclyl ring or the fused heteroaryl ring may be replaced with a nitrogen atom.

"Halo" or "halogen" refers to bromo, chloro, fluoro or iodo.

"Haloalkyl" refers to a $C_1$-$C_{30}$ alkyl radical as defined above, that is substituted by one or more halo radicals as defined above, e.g., trifluoromethyl, difluoromethyl, trichloromethyl, 2,2,2-trifluoroethyl, 1,2-difluoroethyl, 3-bromo-2-fluoropropyl, 1,2-dibromoethyl, and the like. Unless stated otherwise specifically in the specification, a haloalkyl group may be optionally substituted.

"Heterocyclyl" or "heterocyclic ring" refers to a stable 3- to 18-membered non-aromatic ring radical which consists of 2 to 12 carbon atoms and from 1 to 6 heteroatoms selected from the group consisting of nitrogen, oxygen and sulfur. Unless stated otherwise specifically in the specification, the heterocyclyl radical may be a monocyclic, bicyclic, tricyclic or tetracyclic ring system, which may include fused or bridged ring systems; and the nitrogen, carbon or sulfur atoms in the heterocyclyl radical may be optionally oxidized; the nitrogen atom may be optionally quaternized; and the heterocyclyl radical may be partially or fully saturated. Examples of such heterocyclyl radicals may include, but are not limited to, dioxolanyl, thienyl[1,3]dithianyl, decahydroisoquinolyl, imidazolinyl, imidazolidinyl, isothiazolidinyl, isoxazolidinyl, morpholinyl, octahydroindolyl, octahydroisoindolyl, 2-oxopiperazinyl, 2-oxopiperidinyl, 2-oxopyrrolidinyl, oxazolidinyl, piperidinyl, piperazinyl, 4-piperidonyl, pyrrolidinyl, pyrazolidinyl, quinuclidinyl, thiazolidinyl, tetrahydrofuryl, trithianyl, tetrahydropyranyl, thiomorpholinyl, thiamorpholinyl, 1-oxo-thiomorpholinyl, and 1,1-dioxo-thiomorpholinyl. Unless stated otherwise specifically in the specification, a heterocyclyl group may be optionally substituted.

"Heterocyclyloxy" refers to a radical of the formula —O$R^d$, wherein $R^d$ is a $C_1$-$C_{12}$ heterocyclyl radical as defined above. Unless stated otherwise specifically in the specification, a heterocyclyloxy group may be optionally substituted.

"Heterocyclylalkyloxy" refers to a radical of the formula —O$R^b R^d$ where $R^b$ is a $C_2$-$C_{30}$ alkylene chain as defined above, and $R^d$ is a $C_1$-$C_{12}$ heterocyclyl radical as defined above. Unless stated otherwise specifically in the specification, a heterocyclylalkyloxy group may be optionally substituted.

"Heterocyclylaminyl" refers to a radical of the formula —N($R^a$)$_2R^d$ where $R^a$ is independently H or a $C_1$-$C_{30}$ alkyl radical as defined above, and $R^d$ is a $C_1$-$C_{12}$ heterocyclyl radical as defined above. Unless stated otherwise specifically in the specification, a heterocyclylaminyl group may be optionally substituted.

"Heterocyclylalkylaminyl" refers to a radical of the formula —NR$^a$R$^b$—R$^d$ where $R^a$ is H or a $C_1$-$C_{30}$ alkyl radical as defined above, $R^b$ is a $C_2$-$C_{30}$ alkylene radical as defined above, and $R^d$ is a $C_1$-$C_{12}$ heterocyclyl radical as defined above. Unless stated otherwise specifically in the specification, a cycloalkylalkylaminyl group may be optionally substituted.

"Heterocyclylcarbonyl" refers to a radical of the formula —C(=O)$R^d$ where $R^d$ is a $C_1$-$C_{12}$ heterocyclyl radical as defined above. Unless stated otherwise specifically in the specification, a heterocyclycarbonyl group may be optionally substituted.

"Heterocyclylalkyl" refers to a radical of the formula —$R^bR^d$ where $R^b$ is a $C_2$-$C_{30}$ alkylene chain as defined above, and $R^d$ is a $C_1$-$C_{12}$ heterocyclyl radical as defined above. Unless stated otherwise specifically in the specification, a heterocyclylalkyl group may be optionally substituted.

"Heteroaryl" refers to a 5 to 14 membered ring system radical comprising hydrogen atoms, 1 to 13 carbon atoms, 1 to 6 heteroatoms selected from the group consisting of nitrogen, oxygen and sulfur, and at least one aromatic ring. For purposes of this invention, the heteroaryl radical may be a monocyclic, bicyclic, tricyclic or tetracyclic ring system, which may include fused or bridged ring systems; and the nitrogen, carbon or sulfur atoms in the heteroaryl radical may be optionally oxidized; the nitrogen atom may be optionally quaternized. Examples include, but are not limited to, azepinyl, acridinyl, benzimidazolyl, benzothiazolyl, benzindolyl, benzodioxolyl, benzofuranyl, benzooxazolyl, benzothiazolyl, benzothiadiazolyl, benzo[b][1,4]dioxepinyl, 1,4-benzodioxanyl, benzonaphthofuranyl, benzoxazolyl, benzodioxolyl, benzodioxinyl, benzopyranyl, benzopyranonyl, benzofuranyl, benzofuranonyl, benzothienyl (benzothiophenyl), benzotriazolyl, benzo[4,6]imidazo[1,2-a]pyridinyl, carbazolyl, cinnolinyl, dibenzofuranyl, dibenzothiophenyl, furanyl, furanonyl, isothiazolyl, imidazolyl, indazolyl, indolyl, indazolyl, isoindolyl, indolinyl, isoindolinyl, isoquinolyl, indolizinyl, isoxazolyl, naphthyridinyl, oxadiazolyl, 2-oxoazepinyl, oxazolyl, oxiranyl, 1-oxidopyridinyl, 1-oxidopyrimidinyl, 1-oxidopyrazinyl, 1-oxidopyridazinyl, 1-phenyl-1H-pyrrolyl, phenazinyl, phenothiazinyl, phenoxazinyl, phthalazinyl, pteridinyl, purinyl, pyrrolyl, pyrazolyl, pyridinyl, pyrazinyl, pyrimidinyl, pyridazinyl, quinazolinyl, quinoxalinyl, quinolinyl, quinuclidinyl, isoquinolinyl, tetrahydroquinolinyl, thiazolyl, thiadiazolyl, triazolyl, tetrazolyl, triazinyl, and thiophenyl (i.e. thienyl). Unless stated otherwise specifically in the specification, a heteroaryl group may be optionally substituted.

"Heteroarylalkyl" refers to a radical of the formula —$R^bR^e$ where $R^b$ is a $C_2$-$C_{30}$ alkylene chain as defined above, and $R^e$ is a $C_1$-$C_{13}$ heteroaryl radical as defined above. Unless stated otherwise specifically in the specification, a heteroarylalkyl group may be optionally substituted.

The term "substituted" used herein means any of the above groups (e.g., alkyl, alkylene, alkylcarbonyl, alkoxy, alkoxyalkyl, haloalkoxyalkyl, alkoxycarbonyl, alkoxycarbonylalkyl, aminylcarbonyl, aminylalkyl, alkylaminyl, alkyl sulfonyl, alkylsulfonylalkyl, cyanoalkyl, hydroxylalkyl, aryl, cycloalkyl, cycloalkylalkyl, cycloalkyloxy, cycloalkylaminyl, cycloalkylalkylaminyl, cycloalkylalkyloxy, haloalkyl, heterocyclyl, heterocyclyloxy, heterocyclylalkyloxy, heterocyclylaminyl, heterocyclylalkylaminyl, heterocyclylcarbonyl, heterocyclylalkyl, heteroaryl and/or heteroarylalkyl) wherein at least one hydrogen atom is replaced by a bond to a non-hydrogen atoms such as, but not limited to: a halogen atom such as F, Cl, Br, and I; an oxygen atom in groups such as hydroxyl groups, alkoxy groups, and ester groups; a sulfur atom in groups such as thiol groups, thioalkyl groups, sulfone groups, sulfonyl groups, and sulfoxide groups; a nitrogen atom in groups such as amines, amides, alkylamines, dialkylamines, arylamines, alkylarylamines, diarylamines, N-oxides, imides, and enamines; a silicon atom in groups such as trialkylsilyl groups, dialkylarylsilyl groups, alkyldiarylsilyl groups, and triarylsilyl groups; and other heteroatoms in various other groups. "Substituted" also means any of the above groups in which one or more hydrogen atoms are replaced by a higher-order bond (e.g., a double- or triple-bond) to a heteroatom such as oxygen in oxo, carbonyl, carboxyl, and ester groups; and nitrogen in groups such as imines, oximes, hydrazones, and nitriles. For example, "substituted" includes any of the above groups in which one or more hydrogen atoms are replaced with —NR$^g$R$^h$, —NR$^g$C(=O)R$^h$, —NR$^g$C(=O)NR$^g$R$^h$, —NR$^g$C(=O)OR$^h$, —NR$^g$SO$_2$R$^h$, —OC(=O)NR$^g$R$^h$, —OR$^g$, —SR$^g$, —SOR$^g$, —SO$_2$R$^g$, —OSO$_2$R$^g$, —SO$_2$OR$^g$, =NSO$_2$R$^g$, and —SO$_2$NR$^g$R$^h$. "Substituted also means any of the above groups in which one or more hydrogen atoms are replaced with —C(=O)R$^g$, —C(=O)OR$^g$, —C(=O)NR$^g$R$^h$, —CH$_2$SO$_2$R$^g$, —CH$_2$SO$_2$NR$^g$R$^h$. In the foregoing, $R^g$ and $R^h$ are the same or different and independently hydrogen, alkyl, alkoxy, alkylaminyl, thioalkyl, aryl, aralkyl, cycloalkyl, cycloalkylalkyl, haloalkyl, heterocyclyl, N-heterocyclyl, heterocyclylalkyl, heteroaryl, N-heteroaryl and/or heteroarylalkyl. "Substituted" further means any of the above groups in which one or more hydrogen atoms are replaced by a bond to an amino, alkylaminyl, cyano, hydroxyl, imino, nitro, oxo, thioxo, halo, alkyl, alkoxy, alkylaminyl, thioalkyl, aryl, aralkyl, cycloalkyl, cycloalkylalkyl, haloalkyl, heterocyclyl, N-heterocyclyl, heterocyclylalkyl, heteroaryl, N-heteroaryl and/or heteroarylalkyl group. In addition, each of the foregoing substituents may also be optionally substituted with one or more of the above substituents.

"Optional" or "optionally" means that the subsequently described event of circumstances may or may not occur, and that the description includes instances where said event or circumstance occurs and instances in which it does not. For example, "optionally substituted aryl" means that the aryl radical may or may not be substituted and that the description includes both substituted aryl radicals and aryl radicals having no substitution.

As used herein, the term "contacting" refers to bringing two or more chemical molecules to close proximity so that a chemical reaction between the two or more chemical molecules can occur. For example, contacting may comprise mixing and optionally continuously mixing the chemicals. Contacting may be done by fully or partially dissolving or suspending two or more chemicals in one or more solvents, mixing of a chemical in a solvent with another chemical in solid and/or gas phase or being attached on a solid support, such as a resin, or mixing two or more chemicals in gas or solid phase and/or on a solid support, that are generally known to those skilled in the art.

In this disclosure, we present black-to-transmissive electrochromic polymers (hereinafter also referred to as "black polymers") that absorb across the entire visible spectrum and realize an obvious color change from black to transmissive with an applied voltage. Also provided is a method for synthesizing a black polymer via controlling monomer feed ratios in a direct arylation polymerization. The direct arylation polymerization method features formations of C—C bonds between halogenated arenes and simple arenes with active C—H bonds, thereby circumventing the preparation of organometallic derivatives and decreasing overall production cost of conjugated polymers.

In some embodiments, provided is a black-to-transmissive electrochromic polymer of Formula (I):

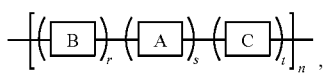

(I)

wherein

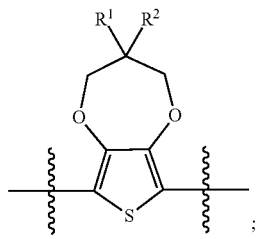 is of the formula

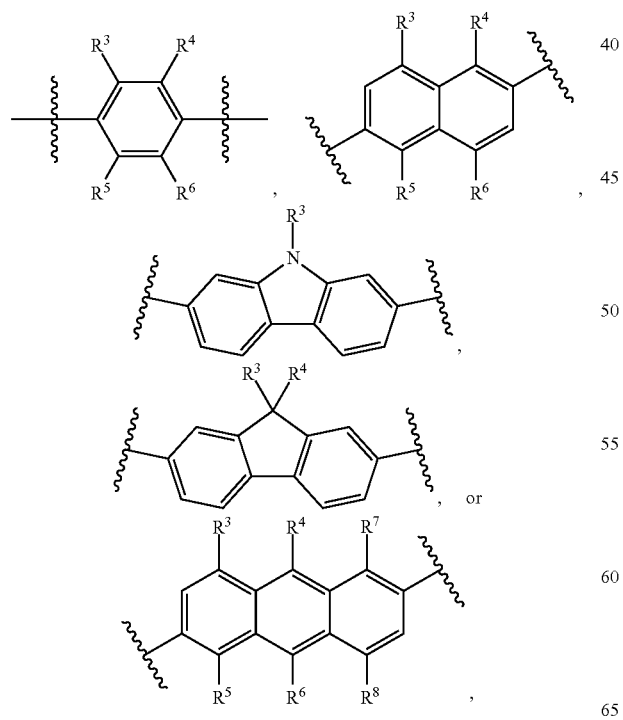

or a combination thereof;

[C] of the formula

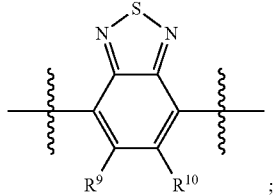

;

each of $R^1$, $R^2$, $R^3$, $R^4$, $R^5$, $R^6$, $R^7$, $R^8$, $R^9$, and $R^{10}$ is independently hydrogen, optionally substituted $C_1$-$C_{30}$ alkyl, optionally substituted $C_2$-$C_{30}$ alkenyl, optionally substituted $C_2$-$C_{30}$ alkynyl, optionally substituted $C_2$-$C_{30}$ alkylcarbonyl, optionally substituted $C_1$-$C_{30}$ alkoxy, optionally substituted $C_3$-$C_{30}$ alkoxyalkyl, optionally substituted $C_2$-$C_{30}$ alkoxycarbonyl, optionally substituted $C_4$-$C_{30}$ alkoxycarbonylalkyl, optionally substituted $C_1$-$C_{30}$ aminylcarbonyl, optionally substituted $C_4$-$C_{30}$ aminylalkyl, optionally substituted $C_1$-$C_{30}$ alkylaminyl, optionally substituted $C_1$-$C_{30}$ alkyl sulfonyl, optionally substituted $C_3$-$C_{30}$ alkylsulfonylalkyl, optionally substituted $C_6$-$C_{18}$ aryl, optionally substituted $C_3$-$C_{15}$ cycloalkyl, optionally substituted $C_3$-$C_{30}$ cycloalkylaminyl, optionally substituted $C_5$-$C_{30}$ cycloalkylalkylaminyl, optionally substituted $C_5$-$C_{30}$ cycloalkylalkyl, optionally substituted $C_5$-$C_{30}$ cycloalkylalkyloxy, optionally substituted $C_1$-$C_{12}$ heterocyclyl, optionally substituted $C_1$-$C_{12}$ heterocyclyloxy, optionally substituted $C_3$-$C_{30}$ heterocyclylalkyloxy, optionally substituted $C_1$-$C_{30}$ heterocyclylalkyloxy, optionally substituted $C_1$-$C_{30}$ heterocyclylaminyl, optionally substituted $C_5$-$C_{30}$ heterocyclylalkylaminyl, optionally substituted $C_2$-$C_{12}$ heterocyclylcarbonyl, optionally substituted $C_3$-$C_{30}$ heterocyclylalkyl, optionally substituted $C_1$-$C_{13}$ heteroaryl, or optionally substituted $C_3$-$C_{30}$ heteroarylalkyl;

each r, s and t is independently an integer of equal to or greater than 1;

n is an integer of equal to or greater than 1;

⌇ represents connection to the rest of the molecule; and the average ratio of [B], [A], and [C] in the polymer is x:y:z, wherein x ranges from about 0.2 to about 0.6, y ranges from about 1.2 to about 1.45, and z ranges from about 0.2 to about 0.45, and x+y+z is about 2.

In some embodiments, x ranges from about 0.2 to about 0.6, y ranges from about 1.2 to about 1.45, and z ranges from about 0.2 to about 0.35. In some embodiments, x ranges from about 0.2 to about 0.4, y ranges from about 1.3 to about 1.45, and z ranges from about 0.2 to about 0.35. In some embodiments, x is about 0.2, y is about 1.2, and z is about 0.35. In some embodiments, x is about 0.3, y is about 1.45, and z is about 0.25. In some embodiments, x is about 0.4, y is about 1.35, and z is about 0.25. In some embodiments, x is about 0.4, y is about 1.4, and z is about 0.2. In some embodiments, x is about 0.6, y is about 1.2, and z is about 0.2.

In some embodiments, each $R^1$ and $R^2$ is independently $C_1$-$C_{30}$ alkoxyalkyl. In some embodiments, each $R^1$ and $R^2$ is independently unsubstituted $C_1$-$C_{30}$ alkoxyalkyl.

In some embodiments, each $R^1$ and $R^2$ is

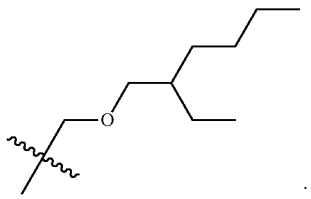 [SMILES: *COCC(CC)CCCC]

In some embodiments, one or two of $R^3$, $R^4$, $R^5$, $R^6$, $R^7$ and $R^8$ are independently $C_1$-$C_{30}$ alkoxy, and the rest of $R^3$, $R^4$, $R^5$, $R^6$, $R^7$ and $R^8$ are hydrogen.

In some embodiments, each $R^3$ and $R^6$ is hydrogen, and each $R^4$ and $R^5$ is independently $C_1$-$C_{30}$ alkoxy.

In some embodiments, two of $R^3$, $R^4$, $R^5$, $R^6$, $R^7$ and $R^8$ are

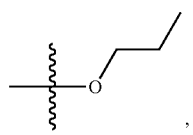, and the rest of $R^3$, $R^4$, $R^5$, $R^6$, $R^7$ and $R^8$ are hydrogen.

In some embodiments, each $R^3$ and $R^6$ is hydrogen, and each $R^4$ and $R^5$ is

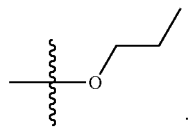

In some embodiments, each $R^9$ and $R^{10}$ is hydrogen.

In some embodiments, [A] is of the formula

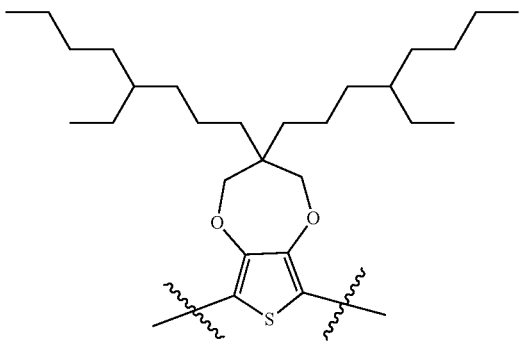

In some embodiments, [B] is of the formula

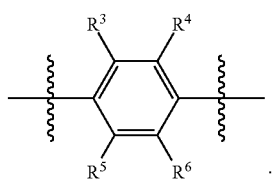

In some embodiments, each $R^3$ and $R^6$ is hydrogen, and each $R^4$ and $R^5$ is independently $C_1$-$C_{30}$ alkoxy.

In some embodiments, [B] is of the formula

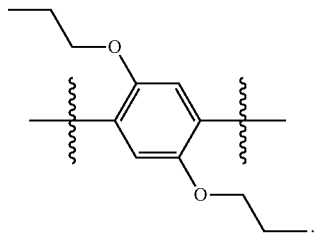 [SMILES: *c1cc(OCCC)c(*)cc1OCCC]

In some embodiments, [B] is of the formula

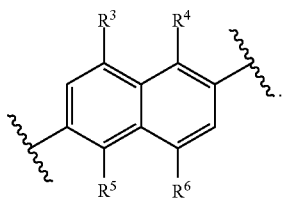

In some embodiments, each $R^3$ and $R^6$ is hydrogen, and each $R^4$ and $R^5$ is independently $C_1$-$C_{30}$ alkoxy. In some embodiments, each $R^3$ and $R^6$ is hydrogen, and each $R^4$ and $R^5$ is

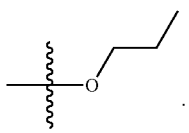

In some embodiments, [B] is of the formula

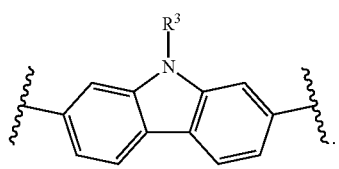

In some embodiments, $R^3$ is hydrogen. In some embodiments, $R^3$ is independently $C_1$-$C_{30}$ alkoxy. In some embodiments, $R^3$ is

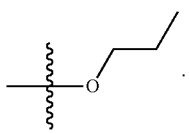 [SMILES: *OCCC]

In some embodiments, [B] is of the formula

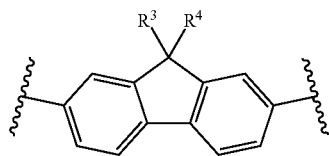

In some embodiments, each $R^3$ and $R^4$ is independently hydrogen or $C_1$-$C_{30}$ alkoxy. In some embodiments, each $R^3$ and $R^4$ is hydrogen or

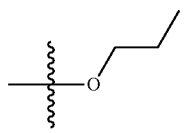

In some embodiments, [B] is of the formula

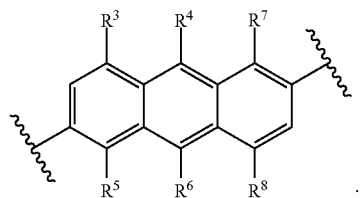

In some embodiments, two of $R^3$, $R^4$, $R^5$, $R^6$, $R^7$ and $R^8$ are independently $C_1$-$C_{30}$ alkoxy, and the rest of $R^3$, $R^4$, $R^5$, $R^6$, $R^7$ and $R^8$ are hydrogen. In some embodiments, two of $R^3$, $R^4$, $R^5$, $R^6$, $R^7$ and $R^8$ are independently

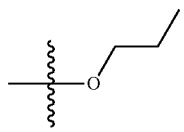

and the rest of $R^3$, $R^4$, $R^5$, $R^6$, $R^7$ and $R^8$ are hydrogen.

In some embodiments, [C] is of the formula

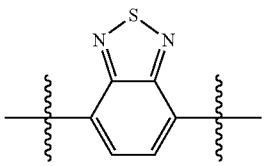

In some embodiments, provided is a method for synthesizing a black-to-transmissive electrochromic polymer, comprising:

contacting Monomer 1, Monomer 2, Monomer 3 and Monomer 4 under polymerization conditions to form the black-to-transmissive electrochromic polymer, wherein a ratio of Monomer 1:Monomer 2:Monomer 3:Monomer 4 is 1:x:y':z, x+y'+z is about 1, x ranges from about 0.2 to about 0.6, y' ranges from about 0.2 to about 0.45, and z ranges from about 0.2 to about 0.45;

Monomer 1 is of the formula

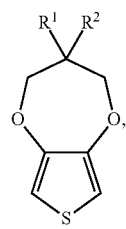

Monomer 2 is of the formula

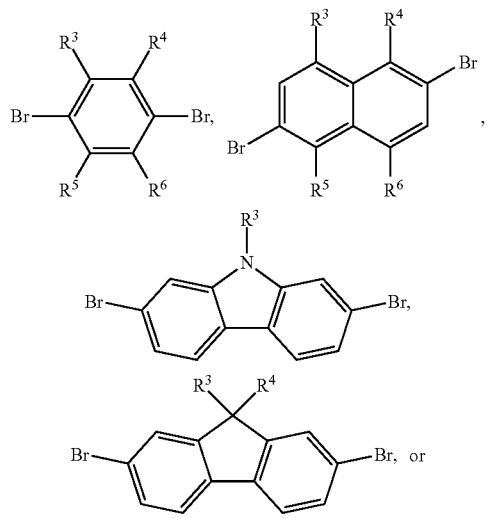

or a combination thereof,

Monomer 3 is of the formula

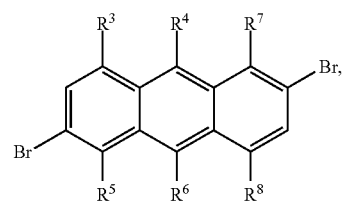

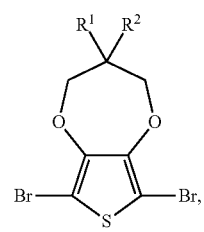

and Monomer 4 is of the formula

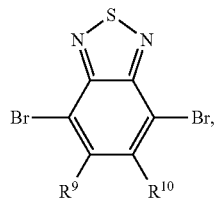

and
wherein each of $R^1$, $R^2$, $R^3$, $R^4$, $R^5$, $R^6$, $R^7$, $R^8$, $R^9$, and $R^{10}$ is independently hydrogen, optionally substituted $C_1$-$C_{30}$ alkyl, optionally substituted $C_2$-$C_{30}$ alkenyl, optionally substituted $C_2$-$C_{30}$ alkynyl, optionally substituted $C_2$-$C_{30}$ alkylcarbonyl, optionally substituted $C_1$-$C_{30}$ alkoxy, optionally substituted $C_3$-$C_{30}$ alkoxyalkyl, optionally substituted $C_2$-$C_{30}$ alkoxycarbonyl, optionally substituted $C_4$-$C_{30}$ alkoxycarbonylalkyl, optionally substituted $C_1$-$C_{30}$ aminylcarbonyl, optionally substituted $C_4$-$C_{30}$ aminylalkyl, optionally substituted $C_1$-$C_{30}$ alkylaminyl, optionally substituted $C_1$-$C_{30}$ alkyl sulfonyl, optionally substituted $C_3$-$C_{30}$ alkylsulfonylalkyl, optionally substituted $C_6$-$C_{18}$ aryl, optionally substituted $C_3$-$C_{15}$ cycloalkyl, optionally substituted $C_3$-$C_{30}$ cycloalkylaminyl, optionally substituted $C_5$-$C_{30}$ cycloalkylalkylaminyl, optionally substituted $C_5$-$C_{30}$ cycloalkylalkyl, optionally substituted $C_5$-$C_{30}$ cycloalkylalkyloxy, optionally substituted $C_1$-$C_{12}$ heterocyclyl, optionally substituted $C_1$-$C_{12}$ heterocyclyloxy, optionally substituted $C_3$-$C_{30}$ heterocyclylalkyloxy, optionally substituted $C_1$-$C_{30}$ heterocyclylalkyloxy, optionally substituted $C_1$-$C_{30}$ heterocyclylaminyl, optionally substituted $C_5$-$C_{30}$ heterocyclylalkylaminyl, optionally substituted $C_2$-$C_{12}$ heterocyclylcarbonyl, optionally substituted $C_3$-$C_{30}$ heterocyclylalkyl, optionally substituted $C_1$-$C_{13}$ heteroaryl, or optionally substituted $C_3$-$C_{30}$ heteroarylalkyl.

In some embodiments, x ranges from about 0.2 to about 0.6, y' ranges from about 0.2 to about 0.45, and z ranges from about 0.2 to about 0.35. In some embodiments, x ranges from about 0.2 to about 0.4, y' ranges from about 0.3 to about 0.45, and z ranges from about 0.2 to about 0.35. In some embodiments, x is about 0.2, y' is about 0.2, and z is about 0.35. In some embodiments, x is about 0.3, y' is about 0.45, and z is about 0.25. In some embodiments, x is about 0.4, y' is about 0.35, and z is about 0.25. In some embodiments, x is about 0.4, y' is about 0.4, and z is about 0.2. In some embodiments, x is about 0.6, y' is about 0.2, and z is about 0.2.

In some embodiments, Monomer 1 is of the formula

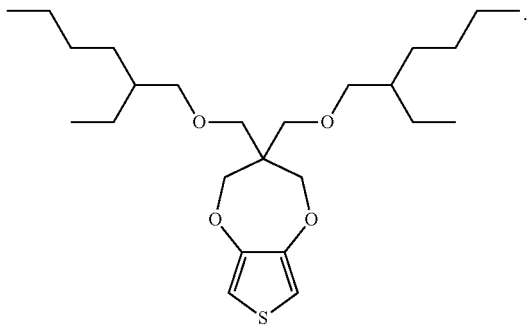 [SMILES: CCCCC(CC)COCC1(COCC(CC)CCCC)COc2cscc2OC1]

In some embodiments, Monomer 2 is of the formula

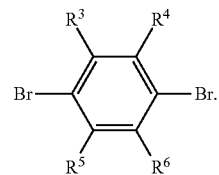

In some embodiments, each $R^3$ and $R^6$ is hydrogen, and each $R^4$ and $R^5$ is independently $C_1$-$C_{30}$ alkoxy.

In some embodiments, Monomer 2 is of the formula

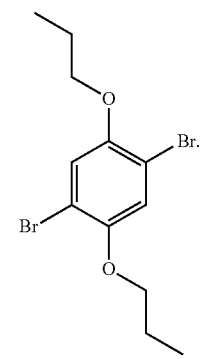

In some embodiments, Monomer 2 is of the formula

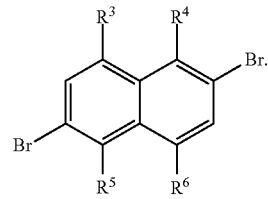

In some embodiments, each $R^3$ and $R^6$ is hydrogen, and each $R^4$ and $R^5$ is independently $C_1$-$C_{30}$ alkoxy. In some embodiments, each $R^3$ and $R^6$ is hydrogen, and each $R^4$ and $R^5$ is

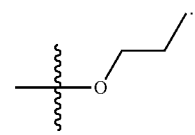

In some embodiments, Monomer 2 is of the formula

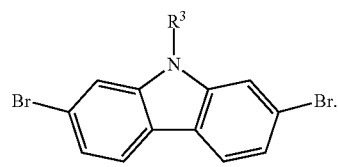

In some embodiments, $R^3$ is hydrogen. In some embodiments, $R^3$ is independently $C_1$-$C_{30}$ alkoxy. In some embodiments, $R^3$ is

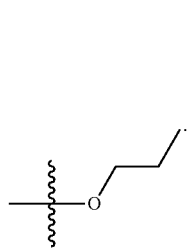 [SMILES: *OCCC]

In some embodiments, Monomer 2 is of the formula

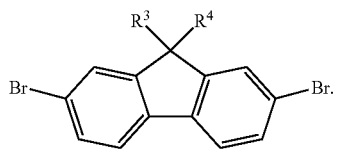

In some embodiments, each $R^3$ and $R^4$ is independently hydrogen or $C_1$-$C_{30}$ alkoxy. In some embodiments, each $R^3$ and $R^4$ is independently hydrogen or

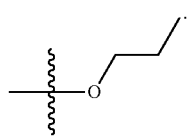 [SMILES: *OCCC]

In some embodiments, Monomer 2 is of the formula

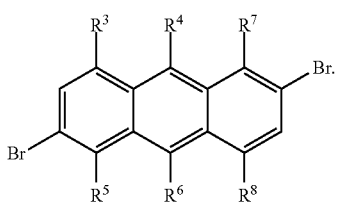

In some embodiments, two of $R^3$, $R^4$, $R^5$, $R^6$, $R^7$ and $R^8$ are independently $C_1$-$C_{30}$ alkoxy, and the rest of $R^3$, $R^4$, $R^5$, $R^6$, $R^7$ and $R^8$ are hydrogen. In some embodiments, two of $R^3$, $R^4$, $R^5$, $R^6$, $R^7$ and $R^8$ are

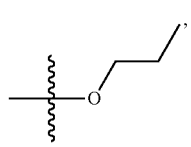 [SMILES: *OCCC]

and the rest of $R^3$, $R^4$, $R^5$, $R^6$, $R^7$ and $R^8$ are hydrogen.

In some embodiments, Monomer 3 is of the formula

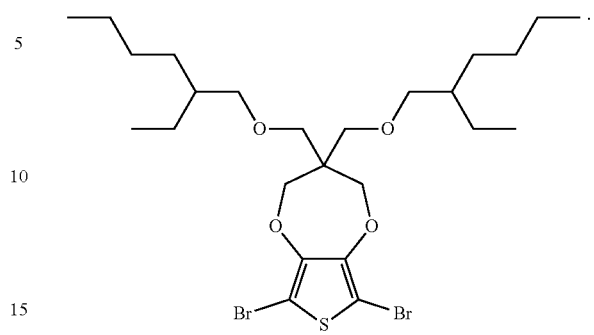

In some embodiments, Monomer 4 is of the formula

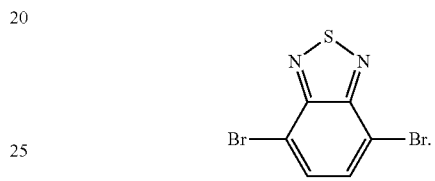

In some embodiments, the polymerization condition comprises $K_2CO_3$, PivOH, and $Pd(OAc)_2$.

In some embodiments, the polymerization condition comprises about 2-3 equivalent of $K_2CO_3$, about 0.1-0.5 equivalent of PivOH and about 0.01-0.05 equivalent of $Pd(OAc)_2$ with respect to 1 equivalent of Monomer 1.

In some embodiments, the polymerization condition comprises about 2.6 equivalent of $K_2CO_3$, about 0.3 equivalent of PivOH and about 0.02 equivalent of $Pd(OAc)_2$ with respect to 1 equivalent of Monomer 1.

In some embodiments, the polymerization condition further comprises an inert atmosphere and a degassed solvent selected from N-methyl-2-pyrrolidone, N,N-dimethylacetamide, and N,N-dimethylformamide, or a combination thereof.

In some embodiments, the polymerization condition further comprises a temperature of about 100° C. to about 200° C. or about 140° C.

In some embodiments, the polymerization condition further comprises isolating the black-to-transmissive electrochromic polymer.

In some embodiments, isolating the black-to-transmissive electrochromic polymer comprises transferring the reaction mixture to a solvent of $CH_3OH$;
transferring the reaction mixture to an aqueous HCl solution;
filtering the reaction mixture to obtain a solid material;
dissolving the solid material in chloroform and washing the solid material with an aqueous HCl solution;
concentrating and precipitating the solid material with $CH_3OH$; and
obtaining the polymer by filtering and drying.

In some embodiments, provided is a black-to-transmissive electrochromic polymer synthesized by a method described herein.

In some embodiments, provided is a black-to-transmissive electrochromic polymer, wherein the polymer is synthesized by a method comprising contacting Monomer 1, Monomer 2, Monomer 3 and Monomer 4 under a direct arylation polymerization condition, wherein a ratio of Monomer 1:Monomer 2:Monomer 3:Monomer 4 is 1:x:y':z, x+y'+z is about 1, x ranges from about 0.2 to about 0.6, y' ranges from about 0.2 to about 0.45, and z ranges from about 0.2 to about 0.45, and Monomer 1, Monomer 2, Monomer 3 and Monomer 4 are as described herein.

In some embodiments, the ratio of Monomer 1:Monomer 2:Monomer 3:Monomer 4 is 1:x:y':z, x+y'+z is about 1, x ranges from about 0.2 to about 0.6, y' ranges from about 0.2 to about 0.45, and z ranges from about 0.2 to about 0.35.

In some embodiments, Monomer 1 is of the formula

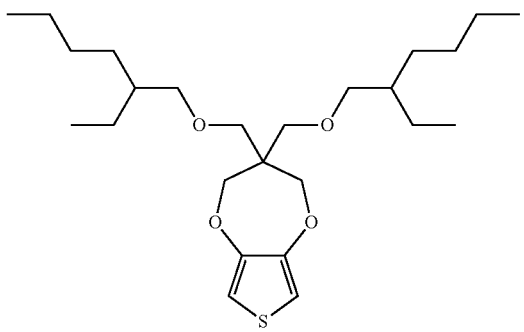

In some embodiments, Monomer 2 is of the formula

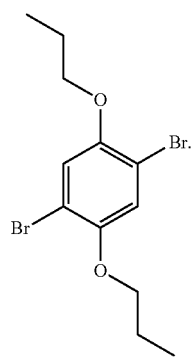

In some embodiments, Monomer 3 is of the formula

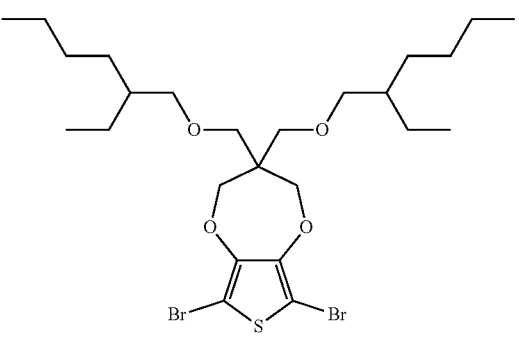

In some embodiments, Monomer 4 is of the formula

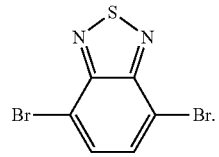

In some embodiments, the polymer is a black-to-transmissive electrochromic conjugated copolymer.

In some embodiments, the polymer has an average molecular weight of about 5.0-100 kDa.

In some embodiments, the polymer has a polydispersity index of about 1.2-1.7.

In some embodiments, the polymer has a low band gap of about 1.61-1.65 eV.

In some embodiments, the black-to-transmissive electrochromic polymer has a normalized absorbance from about 420 nm to about 680 nm of at least 0.7.

In some embodiments, the black-to-transmissive electrochromic polymer has a normalized absorbance from about 420 nm to about 680 nm of at least 0.9.

In some embodiments, x is about 0.3-0.4. In some embodiments, y' is about 0.35-0.45. In some embodiments, z is about 0.2-0.25.

In some embodiments, x is about 0.3, y' is about 0.45 and z is about 0.25.

In some embodiments, x is about 0.4, y' is about 0.35 and z is about 0.25.

In some embodiments, x is about 0.4, y' is about 0.4 and z is about 0.25.

In some embodiments, x is about 0.4, y' is about 0.4 and z is about 0.2.

In some embodiments, the polymer has an absorbance spectrum during 400-750 nm related to a π-π* transition.

In some embodiments, provided is a black-to-transmissive electrochromic polymer thin film, comprising an indium tin oxide (ITO) coated glass spin-coated with a black-to-transmissive polymer described herein.

In some embodiments, the film changes color from black (L* is 0-60, a* is −10 to 5, and b* is −10 to 5) to transmissive (L* is 70 to 100, a* is −10 to 5, and b* is −10 to 5) with an applied voltage of 0-1.2 V, L* represents lightness, and a* and b* are hue and chroma values, respectively.

In some embodiments, the film changes color from black (L* is 20-50, a* is −10 to 5, and b* is −10 to 5) to transmissive (L* is 80 to 90, a* is −10 to 5, and b* is −10 to 5) with an applied voltage of 0-1.2 V, L* represents lightness, and a* and b* are hue and chroma values, respectively.

In some embodiments, the film changes color from black (L* is about 49.2, a* is −10 to 5, and b* is −10 to 5) to transmissive (L* is about 85, a* is −10 to 5, and b* is −10 to 5) with an applied voltage of 0-1.2 V, L* represents lightness, and a* and b* are hue and chroma values, respectively.

In some embodiments, the film changes color from black (L* is 20-50, a* is −5 to 0, and b* is −10 to 0) to transmissive (L* is 80 to 90, a* is −5 to 0, and b* is −5 to 0) with an applied voltage of 0-1.2 V, L* represents lightness, and a* and b* are hue and chroma values, respectively.

In some embodiments, the film changes color from black (L* is about 49.2, a* is −5 to 0, and b* is −10 to 0) to transmissive (L* is about 85, a* is −5 to 0, and b* is −5 to 0) with an applied voltage of 0-1.2 V, L* represents lightness, and a* and b* are hue and chroma values, respectively.

In some embodiments, the film changes color from black (L* is about 49.2, a* is about 3.6, b* is about −7.7) to transmissive (L* is about 85, a* is about −4.6, b* is about −5.8) with an applied voltage of about 0 to about 1.2 V, L* represents lightness, and a* and b* are hue and chroma values, respectively.

In some embodiments, the film changes color from black (L*=49.2, a*=3.6, b*=−7.7) to transmissive (L*=85, a*=−4.6, b*=−5.8) with an applied voltage of 0-1.2 V, L* represents lightness, and a* and b* are hue and chroma values, respectively.

In some embodiments, the film reaches an optical contrast of about 70% within 10 seconds on a small conductive substrate.

In some embodiments, the film has a coloration efficiency of at least 100 cm² C⁻¹, at least 125 cm² C⁻¹, at least 150 cm² C⁻¹, at least 175 cm² C⁻¹, or at least 200 cm² C⁻¹.

In some embodiments, the film has a coloration time of no more than 5 seconds and a bleaching time of no more than about 5 seconds.

In some embodiments, the film has a coloration time of about 3.73 seconds and a bleaching time of about 3.70 seconds on small conductive substrate, such as a conductive substrate having an area of less than 1 square inch.

In some embodiments, the film has a coloration efficiency of at least 100 cm²/C.

In some embodiments, the film has an optical loss of no more than 10% or no more than 5% after 1400 long-term oxidation-reduction switch cycles.

In some embodiments, provided is an electrochromic device, comprising:
an octadecyltrichlorosilane (OTS) modified indium tin oxide (ITO) electrode spin-coated with a black-to-transmissive electrochromic polymer described herein as a working electrode; and
a colorless ITO as a counter electrode layer.

In some embodiments, the electrochromic device displays a contrast of about 40% or more.

In some embodiments, the electrochromic device switches color from black (a* is −5 to 0, b* is −10 to 0) when a potential of −1V is applied to transmissive (a* is −8 to 0, b* is −5 to 0) when a potential of 1.8 V is applied, and a* and b* are hue and chroma values, respectively. During the transition of such color change, a*, b* consistently in a range of −13 to 0.

In some embodiments, the electrochromic device switches color from black (as described herein, e.g., L*=37.8, a*=2.5, b*=−6.4) when a potential of −1 V is applied to transmissive (as described herein, e.g., L*=72.6, a*=−8.0, b*=−6.5) when a potential of 1.8 V is applied. Here, L* represents lightness (ranging from 0 to 100).

In some embodiments, the black polymer is a black-to-transmissive electrochromic conjugated copolymer, which absorbs across the entire visible spectrum and realizes an obvious color change from black (as described herein, e.g., L*=49.2, a*=3.6, b*=−7.7) to transmissive (as described herein, e.g., L*=85, a*=−4.6, b*=−5.8) with an applied voltage of 0-1.2 V. An optical contrast as high as nearly 70% can be reached within 10 seconds in electrochromic thin films made of the black polymer, which is superior to reported black-to-transmissive electrochromic materials. Moreover, long-term redox (oxidation-reduction) stability has been demonstrated with an optical loss as low as 2.1% after 1400 switching cycles. In addition, a black-to-transmissive ECD based on the as-prepared electrochromic films can be designed using a transparent indium tin oxide (ITO) as a counter electrode for charge storage. The ECD displays high contrasts for 43.6%, switching from a saturated black state (L*=37.8, a*=2.5, b*=−6.4) to a transmissive state (L*=72.6, a*=−8.0, b*=−6.5). These outstanding performances potentially make the black polymer a promising electrochromic material and can be incorporated into privacy glass, smart windows and other related electrochromic devices.

The D-A approach, alternating electron-rich and electron-deficient moieties along a π-conjugated backbone, has been proved especially valuable in the synthesis of dual-band and broadly absorbing chromophores with useful photovoltaic and electrochromic properties. A chromophore refers to an atom or group whose presence is responsible for the color of a compound. An evolution of the two-band spectral absorption can be observed on varying relative compositions of electron-rich and electron-deficient substituents along the π-conjugated backbone. In this regard, we have synthesized five black polymers P1-P5 in a direct arylation polymerization by varying feed ratios of electron-rich to electron-deficient species along the conjugated backbone. For P1 to P5, average molecular weights (Mn) and polydispersity index (PDI) are about 5.0 to 15.8 kDa and 1.2 to 1.7, respectively. Polydispersity index refers to either molecular mass or degree of polymerization. Ratios of polymer components, electrochemical properties and GPC (Gel Permeation Chromatography) estimated molecular weights for P1 to P5 are listed in Table 1. Here, x, y', z are feed ratios of monomer 2, 3, and 4 with respect to monomer 1, and x+y'+z=1 with 1.0 equivalent of monomer 1. Examples of chemical formulas of monomer 1, 2, 3 and 4 are presented in FIG. 1. $\lambda_{onset}$ stands for an onset of a lower-energy optical transition; $E_{HOMO}$ is a HOMO (highest occupied molecular orbital) energy level of a black polymer; $E_{LUMO}$ is a LUMO (lowest unoccupied molecular orbital) energy level of a black polymer; $E_{ox}$ is an onset oxidation potential of a black polymer; Eg is a band gap (Eg) of a black polymer.

TABLE 1

| x + y' + z = 1 | x | y' | z | $\lambda_{onset}$ (nm) | $E_{ox}$ (vs Ag/Ag⁺) | Eg (eV) | $E_{HOMO}$ (eV) | $E_{LUMO}$ (eV) | Mn (g/mol) | PDI |
|---|---|---|---|---|---|---|---|---|---|---|
| P1 | 0.2 | 0.45 | 0.35 | 767 | 0.42 | 1.62 | −4.90 | −3.28 | 15800 | 1.7 |
| P2 | 0.3 | 0.45 | 0.25 | 769 | 0.37 | 1.61 | −4.85 | −3.24 | 12100 | 1.5 |
| P3 | 0.4 | 0.4 | 0.25 | 760 | 0.42 | 1.63 | −4.90 | −3.27 | 5500 | 1.4 |
| P4 | 0.4 | 0.4 | 0.2 | 750 | 0.38 | 1.65 | −4.86 | −3.21 | 6400 | 1.4 |
| P5 | 0.6 | 0.2 | 0.2 | 760 | 0.42 | 1.63 | −4.90 | −3.27 | 5000 | 1.2 |

In some embodiments, by changing feed ratios of monomer 1, 2, 3 and 4, five different black polymers (P1, P2, P3, P4 and P5) can be obtained with different polymer components and molecular weights.

For P1 concentration: Monomer 1 (250 mg, 0.57 mmol), Monomer 2 (40 mg, 0.11 mmol), Monomer 3 (153 mg, 0.26 mmol), and Monomer 4 (58 mg, 0.20 mmol);

obtained black polymer P1: mass=0.26 g, Mn=15.8 kDa, and PDI=1.7.

For P2 concentration: Monomer 1 (250 mg, 0.57 mmol), Monomer 2 (60 mg, 0.17 mmol), Monomer 3 (153 mg, 0.26 mmol), and Monomer 4 (42 mg, 0.14 mmol);

obtained black polymer P2: mass=0.25 g, Mn=12.1 kDa, and PDI=1.5.

For P3 concentration: Monomer 1 (400 mg, 0.91 mmol), Monomer 2 (128 mg, 0.36 mmol), Monomer 3 (190 mg, 0.32 mmol), and Monomer 4 (67 mg, 0.23 mmol);

obtained black polymer P3: mass=0.36 g, Mn=5.5 kDa, and PDI=1.4.

For P4 concentration: Monomer 1 (400 mg, 0.91 mmol), Monomer 2 (128 mg, 0.36 mmol), Monomer 3 (217 mg, 0.36 mmol), and Monomer 4 (53 mg, 0.18 mmol);

obtained black polymer P4: mass=0.28 g, Mn=6.4 kDa, and PDI=1.4.

For P5 concentration: Monomer 1 (300 mg, 0.68 mmol), Monomer 2 (144 mg, 0.41 mmol), Monomer 3 (81.5 mg, 0.14 mmol), and Monomer 4 (40 mg, 0.14 mmol);

obtained black polymer P5: mass=0.25 g, Mn=5.0 kDa, and PDI=1.2.

FIG. 1 shows a reaction scheme for polymerizations of black polymers, in accordance to exemplary embodiments of the present disclosure. All reagents can be obtained from Sigma Aldrich or Acros and used without further purification unless otherwise noted. Ferrocene (Fc), and Octadecyltrichlorosilane (OTS) can be used without further purification and kept in a desiccator. Propylene carbonate (PC, 99.5%) obtained from Sigma-Aldrich may be purified by a solvent purification system in vacuum. Tetrabutylammonium hexafluorophosphate (TBAPF$_6$, ≥99.0%), platinum wire (99.0%) can be obtained from Sigma-Aldrich. ITO coated glass slides (CG-501N-CUV) can be obtained from Delta Technologies, Ltd., and sequentially cleaned with deionized water, ethanol and acetone.

As shown in FIG. 1, to synthesize the black polymers, 1 equivalent of Monomer 1 may be added to a reaction container, and followed by different ratios of Monomer 2, 3, 4 to obtain a solution. Next, K$_2$CO$_3$, PivOH and Pd(OAc)$_2$ may also be added into the container to create a mixture with the solution. Then O$_2$ is removed from the container by, for example, purged with N$_2$, and this process may be repeated for three times. A degassed solvent, such as N-methyl-2-pyrrolidone, N,N-dimethylacetamide, or N,N-dimethylformamide, can be added to the mixture in the container and the mixture may be heated, such as at a temperature of about 100° C. to about 200° C. or about 140° C. for a period of time under nitrogen to create a reaction mixture comprising the polymer. The hot reaction mixture may be first transferred to a solvent, such as CH$_3$OH, and then transferred to an aqueous acid solution, such as 1M HCl. The reaction mixture can be filtered to obtain a solid material which may be further dissolved in an organic solvent, such as chloroform, and washed with an aqueous acid solution, such as 1M HCl solution. The organic phase may be concentrated and precipitated with another solvent, such as CH$_3$OH. The black polymer in a form of a black solid can be obtained by filtering and drying the organic phase.

In one example, at a first step, 1.0 equivalent of 3,4-propylenedioxythiophene (Prodot) monomer 1 may be added to a Schlenk tube, and followed by different ratios of monomer 2, 3, 4 to obtain a solution. Next, K$_2$CO$_3$ (e.g., 2.6 eq.), PivOH (e.g., 0.3 eq.) and Pd(OAc)$_2$ (e.g., 0.02 eq.) may also be added into the tube to create a mixture with the solution. Then the tube may be kept under vacuum for about 5 min and purged with N$_2$, and this process may be repeated for three times. At a second step, degassed solvent N-methyl-2-pyrrolidone (NMP, and 1.0 g monomer 1 use 40 ml of solvent) can be added to the mixture in the tube and the tube may be heated in an oil bath at 140° C. for 18 hour under nitrogen to create a reaction mixture. At a third step, the hot reaction mixture may be first transferred to a solvent of CH$_3$OH with a ratio of 1:1 and then transferred to 1M HCl with stir. At a fourth step, the reaction mixture can be filtered to obtain a solid material which may be further dissolved in chloroform and washed with 1M HCl solution. At a fifth step, an organic phase may be concentrated and precipitate with CH$_3$OH. At a last step, the black polymer in a form of a black solid, can be obtained by filtering and drying the organic phase. P1 to P5 were prepared accordingly.

In some embodiments, to fabricate ECDs with the obtained black polymers, firstly, conductive sides of cleaned ITO slides may be treated with a UV-ozone chamber for 20 mins to obtain functionalized ITOs. Then the functionalized ITOs may be immersed into an OTS/hexane solution (1 vol %) for 80 mins to form an OTS-modified ITO, and subsequently dried by nitrogen blowing. Solutions of the black polymers in chloroform (60 mg/mL) then can be spin-coated (1500 rpm) onto OTS-modified ITO electrodes to form thin electrochromic films. Thickness (~250-450 nm) of the spin-coated films can be controlled via adjusting a concentration of the black polymer solution from 40-70 mg/mL.

To characterize the obtained black polymers and the ECDs, in some embodiments, $^1$H and $^{13}$C NMR (nuclear magnetic resonance) spectra may be recorded on a Brucker ARX 400 at 293 K with deuterized chlorofrom as solvent. Size exclusive chromatography (SEC) may be performed in tetrahydrofuran under room temperature with calibration curve based on polystyrene standards. UV-vis-NIR spectra (ultraviolet-visible-Near-infrared spectra) may be measured with an Agilent Technologies Cary 6000i UV-Vis-NIR or Agilent Cary 5000 UV-Vis-NIR spectrophotometer. All solution spectra may be collected in chloroform and thin film spectra from spin-coating samples on glass substrates.

In some embodiments, electrochemistry related studies of the polymer films may be carried out on BioLogic SP-150 in a traditional three-electrode system. A Pt wire may be used as a counter electrode, an Ag/AgCl reference electrode may be calibrated with Fc/Fc$^+$ (0.2 M of Fc/propylene carbonate (PC) in 0.2 M of TBAPF$_6$/PC), and the ITO-coated black polymer films may be used as working electrodes. The Cyclic Voltammetry (CV) may be measured from 0-1.2V at 40 mV/s scan rate in a 0.2 M TBAPF$_6$/PC electrolyte solution. CV is a type of potentiodynamic electrochemical measurement, and is used to study the electrochemical properties of an analyte in solution. UV-vis spectra, Spectroelectrochemistry, Kinetic and Color measurement may be recorded on an Agilent Cary 500 Scan UV-vis-NIR spectrophotometer. Photographs of the polymer solutions and films may be illuminated with a D65 light source in building mode and recorded using a digital camera (Nikon D500) in a viewing booth (GTI Graphic Technology, Inc.) All photographs are presented as received without further alteration.

Figures 2A, 2B:
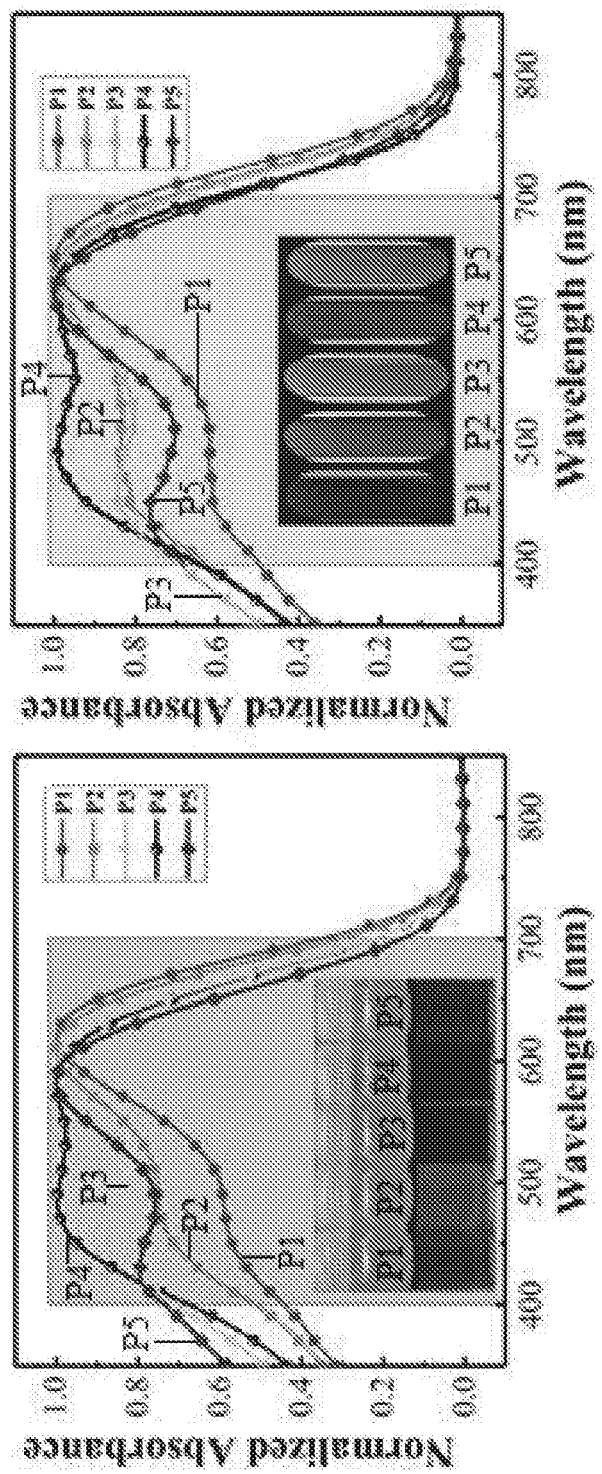
FIG. 2A is a graph illustrating measurement results of solution absorption of black polymers in chloroform.
FIG. 2B is a graph illustrating measurement results of normalized film absorption of the black polymers, consistent with exemplary embodiments of the present disclosure.

FIG. 2A presents solution UV-visible absorption spectra of the black polymers from P1 to P5 in chloroform in accordance to exemplary embodiments of the present disclosure. Insets in FIG. 2A show colors of the black polymers in solution. As shown in FIG. 2A, the five spectra all displayed broad "merging" band in the visible light region, which is different from typical D-A polymer spectra with two single absorption bands. In some embodiments, with a low proportion of monomer 2, P1 demonstrates a deficient absorption at a short-wavelength absorption of 458 nm and thus reveals a blue-green color. When the amount of monomer 2 increases to 0.4 (i.e., P3), the absorbance area at low wavelength is rising and a difference in intensity between two peaks is diminishing. Hence, a further increase monomer 2 concentration may realize a broader and completed absorption. As shown in FIG. 2A, with the increment of the ratio of the electron-rich moiety from P1-P4 (0.2-0.4), P4 demonstrates the most balanced and homogenous absorption spectrum, and almost covers the entire visible region, which is superior to other reported black polymers. Further increasing the ratio of monomer 2 to 0.6, the curve of P5 is uplifted around 420 nm, although it does not present entirely in the short- and long-wavelength transitions, and P5 in solution exhibits a dark blue color. Comparing the black polymers from P1-P5, bathochromic shift (except for P5) and hypsochromic shift is observed at short- and long-wavelength transitions, respectively, which may be due to the increasing ratio of electron-rich moiety. This result may make the two transitions balance with each other and form a "merging" band. Bathochromic shift is a change of spectral band position in the absorption, reflectance, transmittance, or emission spectrum of a molecule to a longer wavelength (lower frequency). Hypsochromic shift is a change of spectral band position in the absorption, reflectance, transmittance, or emission spectrum of a molecule to a shorter wavelength (higher frequency).

In some embodiments, the polymer solutions (60 mg mL$^{-1}$) may be spin-coated onto ITO slides, and the corresponding solid-state optical absorbance spectra are presented in FIG. 2B. Insets in FIG. 2B show colors of the black polymers in solid states. All films demonstrated more black colors and bathochromic shifts relative to their solutions. This may be resulted from a higher degree of order and a more planarity of the polymer chains in the solid state, which may lead to a more black color.

In addition, the band gap (Eg) is an vital and indispensable factor for evaluating opto-electronic properties, the values can be calculated by the onset of the lower-energy optical transition ($\lambda_{onset}$, Eg=1240/$\lambda_{onset}$). Shown in FIG. 2B and Table 1, these five black polymers P1 to P5 have a low band gap from 1.61-1.65 eV.

Figure 3B:
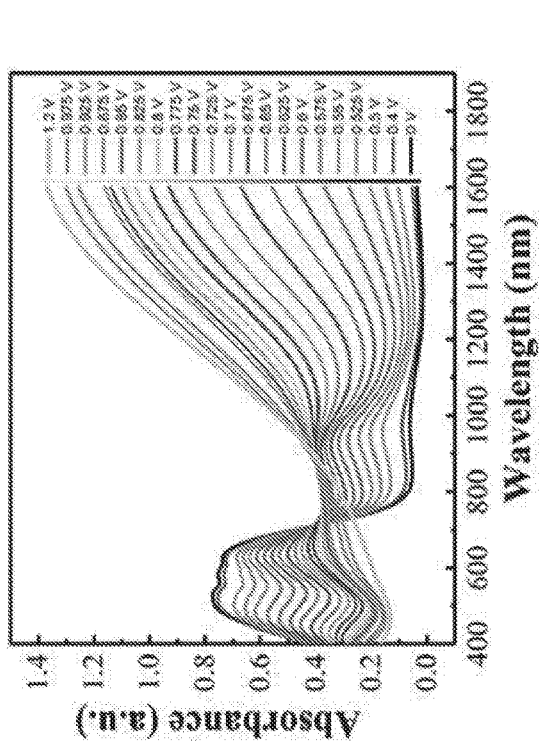
FIG. 3B is a graph illustrating measurement results of spectroelectrochemistry of polymer P4, FIG. 3C a graph illustrating lightness (L*) as a function of applied potential for spin-coated P4 film.
Figure 3D:
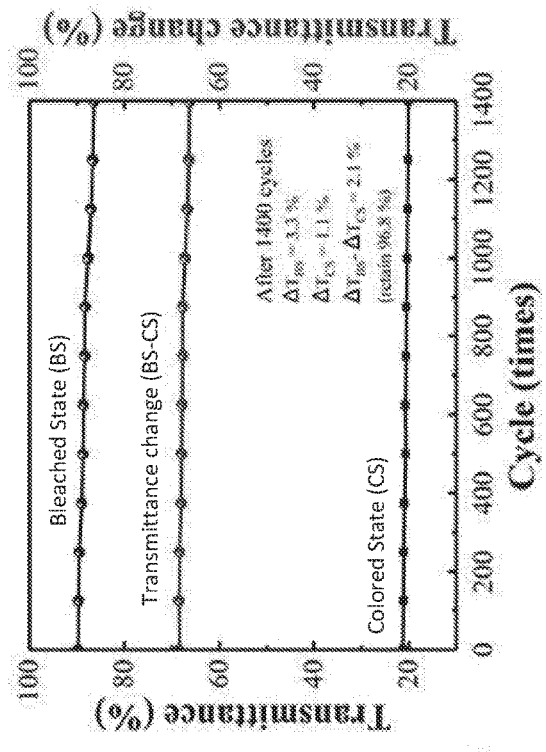
FIG. 3D is a graph illustrating a summary of the square wave potential step chronoabsorptometry of a P4 spin-coated ITO; consistent with exemplary embodiments of the present disclosure.
Figure 3A:
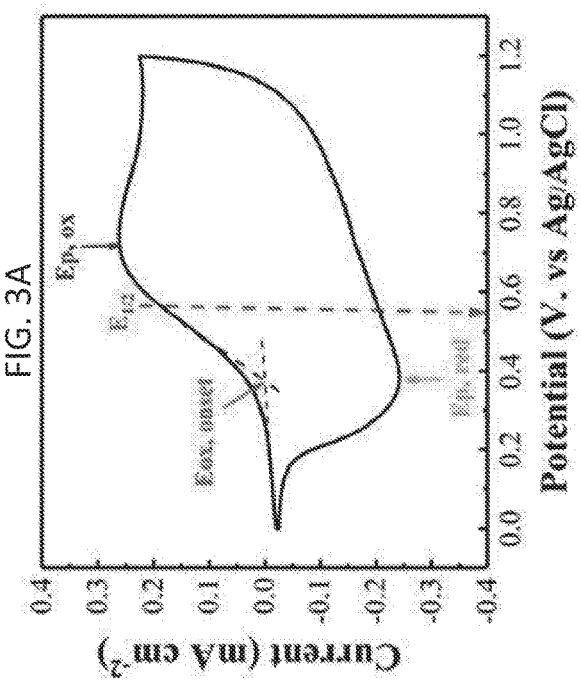
FIG. 3A is a graph illustrating measurement results of cyclic voltammograms of polymer P4.

FIG. 3A shows measurement results of cyclic voltammograms of P4 in 0.2 M TBAPF$_6$/PC at 40 mV/s; and FIG. 3B shows measurement results of spectroelectrochemistry of P4, in accordance to exemplary embodiments in the present disclosure. In some embodiments, the film of P4 may be spin-coated onto ITO-coated glass from chloroform (60 mg mL$^{-1}$). An electrochemical oxidation of the film may be carried out in 0.2 M TBAPF$_6$/PC solution, with Ag/AgCl as a quasi-reference electrode (calibrated against Fc/Fc$^+$), and a platinum wire as the counter electrode. The applied potential may be increased from 0 to +1.2 V vs. Ag/AgCl.

Figure 3C:
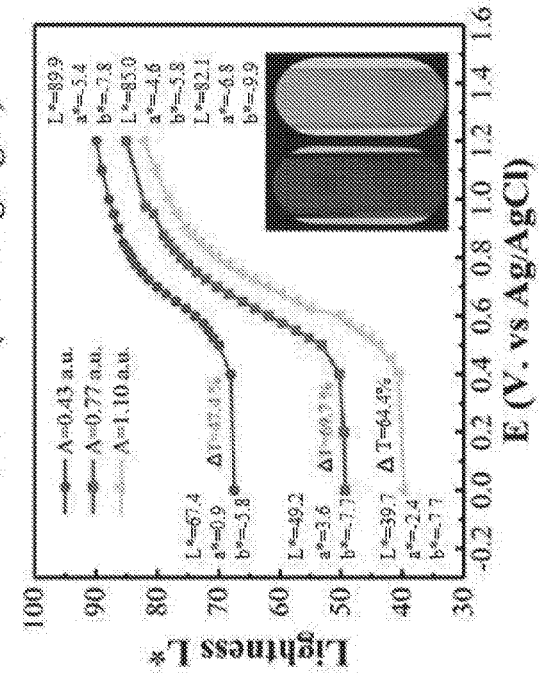
Figure 4A:
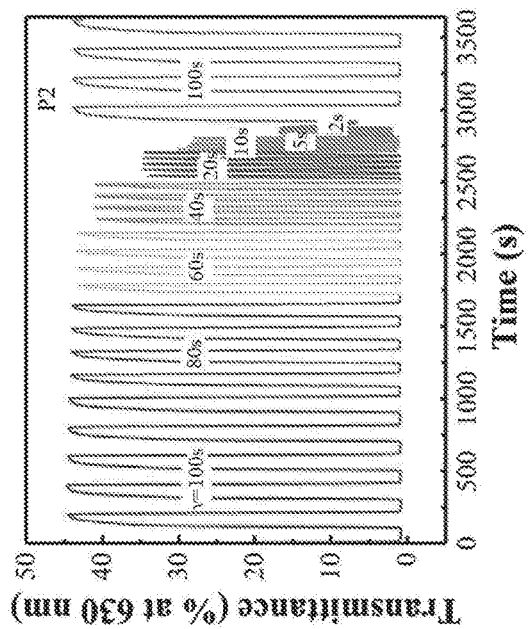
FIGS. 4A-D are graphs illustrating square-wave potential-step chronoabsorptometry of P1, P2, P3 and P4 spin-coated ITOs respectively, consistent with exemplary embodiments of the present disclosure.
Figure 4B:
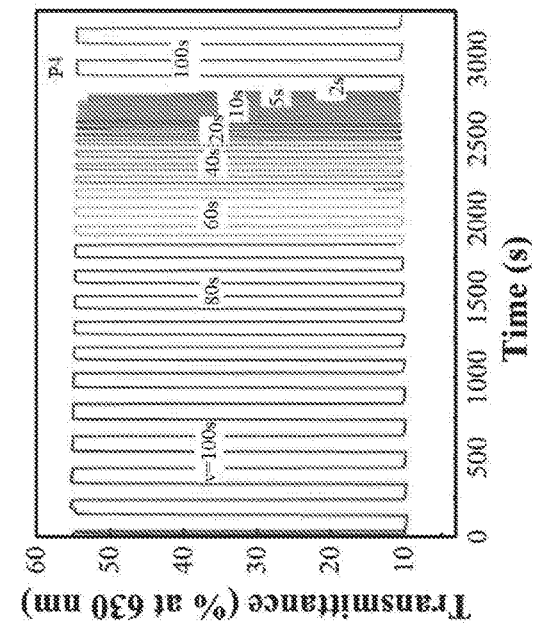
Figure 4C:
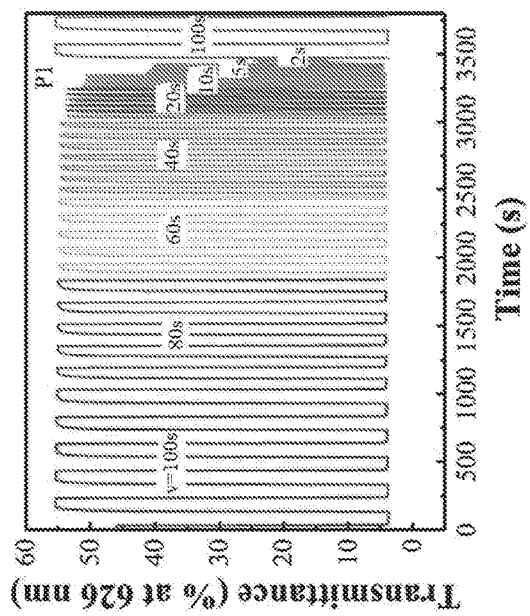
Figure 4D:
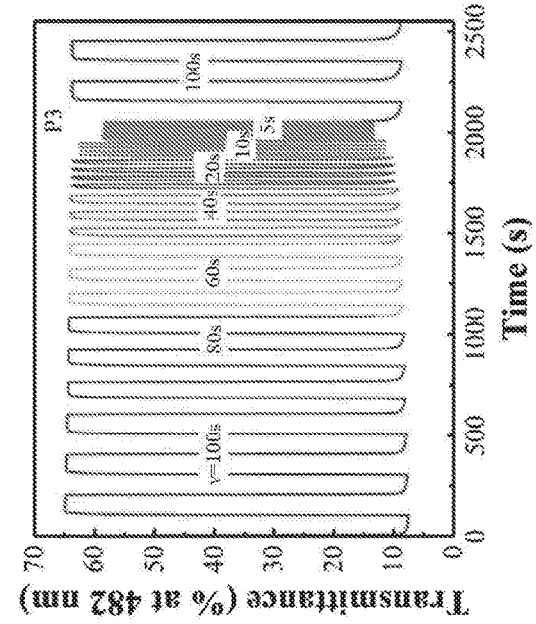

FIG. 3C shows data of lightness (L*) as a function of applied potential for spin-coated P4 film, with L*, a*, and b* values listed. The insets in FIG. 3C are photographs of the films in fully neutral (left) and oxidized states (right), respectively. FIG. 3D shows data of square-wave potential-step chronoabsorptometry of P4 spin-coated on ITO (monitored at 500 nm, 0 to +1.2 V vs. Ag/AgCl in 0.2 M TBAPF$_6$/PC electrolyte solution) with a switching time for 100 s, 80 s, 60 s, 40 s, 20 s, 10 s, 5 s, and 2 s.

In some embodiments, prior to other electrochemical and spectral investigation, a CV measurement may be first conducted to probe and determine a redox potential range, which may be cycled for several times at 40 mV/s to obtain some stable and reproducible curves. FIG. 3A reveals a 16th CV cycles of the P4 film, exhibiting a full and irreversible switch between 0-1.2 V with an onset oxidation potential (E$_{ox}$) of 0.38 V versus an Ag/AgCl pseudoreference electrode. Subsequently, the film may be neutralized at −0.2 V for 60 s at the same condition, and then changes of absorbance spectra from black to transmittance may be recorded under various applied voltages. FIG. 3B displays the spectroelectrochemical series spectra of P4 film. In some embodiments, the film appears black in the neutral state, and shows a broad absorbance spectrum during 400-750 nm related to the π-π* transition, while as the polymer film is doped, the broad peak in the visible region is depleted, and a polaronic and bipolaronic transition appear successively in the near-IR (800-1200 nm) and IR region (>1200 nm). After the complete oxidation (~1.2 V), the absorption band arise beyond 1600 nm, meanwhile, a transmittance change ($\Delta T=T_{bleached}-T_{colored}$) may reach as high as nearly 70% at 500 nm from the colored to the bleached state, which may allow highly transmissive films to the human eye.

In order to have an accurate assessment of the color characteristic changes during the electrochemical switching, in some embodiments, colors can be measured quantitatively utilizing the CIE 1976 L*a*b* color standards, where CIE 1976 is a color space adopted by the International Commission on Illumination (CIE) in 1976, L* represents lightness (ranging from 0 to 100), and a* and b* are hue and chroma values, respectively. More specifically, positive and negative a* values correspond to red and green hues, respectively, and positive and negative b* values denote yellow and blue chromas. Colorimetrical measurements of the black polymer films have been investigated, and P4 shows a relatively blacker color in comparison with others. The results are listed in Table 2. Here, t$_c$ is a coloration time, t$_b$ is a bleaching time and CE is coloration efficiency.

TABLE 2

|    | $\lambda_{max}$ (nm) | L | a | b | L* | a* | b* | ΔT (%, at 10 s) | CE (cm$^2$ C$^{-1}$) | t$_b$ (s) | t$_c$ (s) |
|----|------|------|-------|-------|------|-------|-------|-------|-------|------|------|
| P1 | 630 | 23.7 | −20.0 | −15.9 | 61.5 | −17.8 | −25.9 | 43.76 | 205.1 | 8.30 | 6.00 |
| P2 | 626 | 31.0 | −8.7  | −10.8 | 75.1 | −8.7  | −11.7 | 51.56 | 199.6 | 4.61 | 5.04 |
| P3 | 482 | 28.6 | −7.0  | −9.9  | 68.1 | −10.7 | −16.7 | 57.03 | 165.7 | 4.89 | 4.60 |
| P4 | 500 | 49.2 | 3.6   | −7.7  | 85.0 | −4.6  | −5.8  | 69.68 | 202.4 | 3.73 | 3.70 |
| P5 | 630 | 44.0 | −13.9 | −11.2 | 76.9 | −7.4  | −11.0 | 45.62 | 188.0 | 3.83 | 2.38 |

In some embodiments, colorimetrical measurements may also be performed via varying film thickness. For example, the absorption maximum for the three films of different thickness can be: A1=0.43 a.u., A2=0.77 a.u., and A3=1.10 a.u. respectively, as shown in FIG. 3C. In a neutral state, the L* values of the films exhibit from 39.7 (A3=1.10 a.u.) to 67.4 (A1=0.43 a.u.). When the applied potential is added up to 0.4 V, the bleaching process may occur, which is consistent with the CV results. As the oxidation degree increases gradually, visible absorption regions are undergoing depletion, and polaronic and bipolaronic transitions may progress with colors varying from colored to transmissive. In comparison, the film with the absorption maximum of 0.77 a.u. may obtain a maximum contrast for nearly 70% from a deep black color (L*=49.2, a*=3.6, b*=−7.7) to a highly transmissive near colorless state (L*=85, a*=−4.6, b*=−5.8) upon doping.

Furthermore, coloration switching response and coloration efficiency may also be pivotal factors to assess electrochromic materials in practical applications of display and window devices. In some embodiments, the film switching may be first examined using transmittance change at a certain wavelength as a function of switch time by applying square-wave potential steps for periods of 100, 80, 60, 40, 20, 10, 5, and 2 s. As shown in FIG. 3D, FIGS. 4A-D, and Tables 2, the P4 film shows a largest transmittance change monitored, an excellent switching performance as high as 69.7% at a longer switch time (100 s), also maintaining ΔT>63.2% at 5 s and above. However, the ΔT decreased to 46.0% (a 23.72% loss) at a faster switching pulse of 2 s. Table 3 shows the ΔT of FIGS. 4A-D.

via $\eta=\Delta OD/\Delta Q$. In some embodiments, a CE value of 202.4 $cm^2 C^{-1}$ may be obtained for the P4 film (shown in Table 2 and FIG. 5B), which is superior and comparable to those of previously reported black polymer materials.

In addition, stability is another crucial parameter in a practical utilization of electrochromic materials. In some embodiments, the stability of repeated redox test may be carried out by repeating square-wave potential steps of 10 s (switching between 0 to 1.2 V vs. Ag/AgCl) for 1400 cycles. As shown in FIG. 3D, the film demonstrated outstanding switching stability with only a decrease of 2.1% for transmittance changes.

Figure 6:
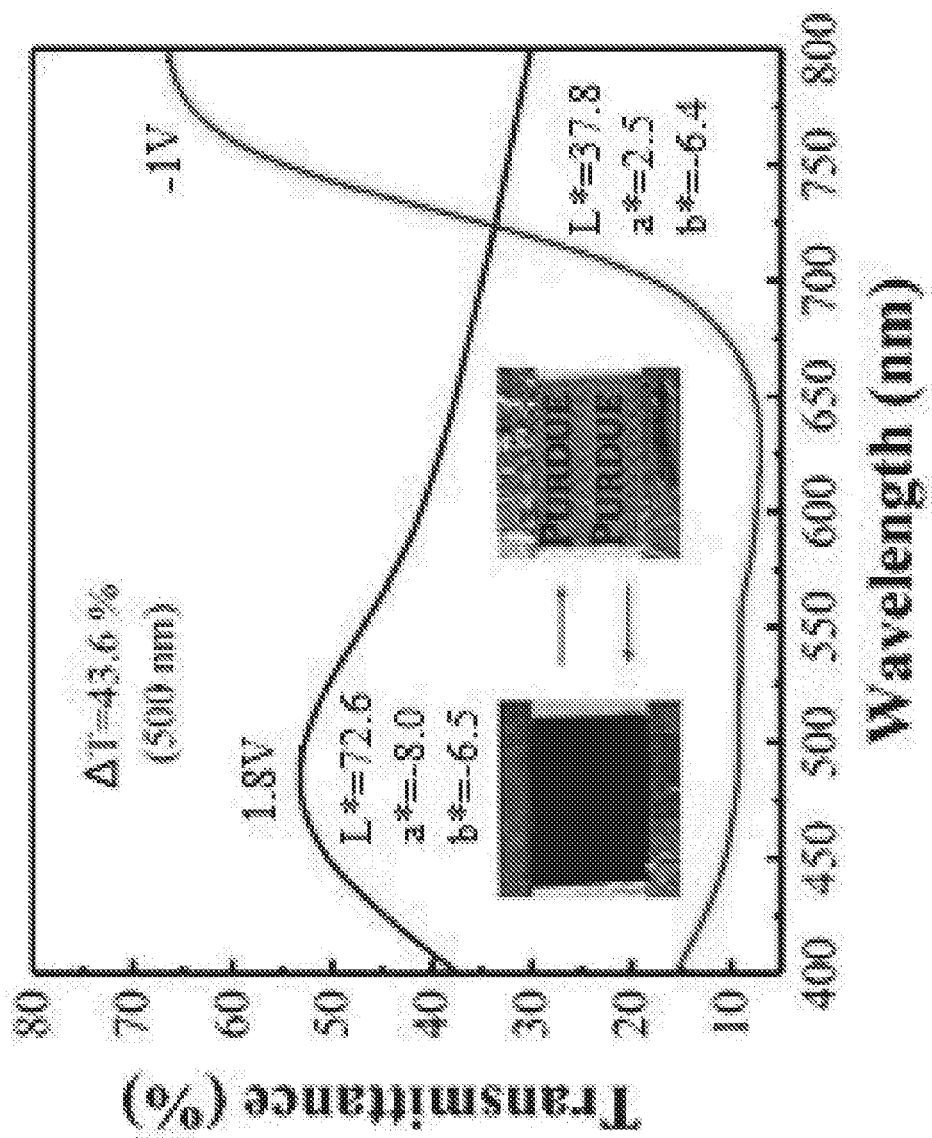
FIG. 6 is a graph illustrating measurement results of transmittance spectra of an ECD, consistent with exemplary embodiments of the present disclosure.

In some embodiments, to verify utility of the black polymers, black-to-transmissive ECDs may be assembled with P4 as a working electrode and a colorless ITO as a counter electrode layer, respectively. Transmittance spectra of the ECDs in the neutral and bleaching state may be measured across the entire visible region, and the detail changes may be shown in FIG. 6. Insets in FIG. 6 show photographs of a same device in reduction and oxidation states. In some embodiments, a potential of 1.8 V is applied to a device, and the device may become highly transmissive (e.g., L*=72.6, a*=−8, b*=−6.5). When the potential is decreased to −1.0 V, the device may recover to its black state (e.g., L*=37.8, a*=2.5, b*=−6.4) with a transmittance contrast of about 43.6% at 500 nm. Hence, polymer P4 can be validated to be an effective and valuable electrochromic material. Further efforts may be put into searching for a well-matched courter electrode and constructing a high-performance ECD.

TABLE 3

| polymer | ΔT (%) | | | | | | | | |
|---|---|---|---|---|---|---|---|---|---|
| | 100 s | 80 s | 60 s | 40 s | 20 s | 10 s | 5 s | 2s | 100 s (2) |
| P1 | 51.6 | 51.0 | 50.8 | 50.6 | 47.2 | 46.2 | 35.9 | 11.2 | 51.4 |
| P2 | 43.8 | 43.1 | 42.3 | 40.0 | 33.7 | 26.9 | 14.6 | 4.1 | 43.3 |
| P3 | 57.0 | 56.0 | 55.4 | 54.7 | 54.0 | 52.6 | 45.3 | 46.0 | 55.11 |
| P4 | 45.6 | 44.8 | 44.6 | 44.4 | 44.3 | 43.8 | 42.2 | 26.8 | 45.2 |

Figure 5B:
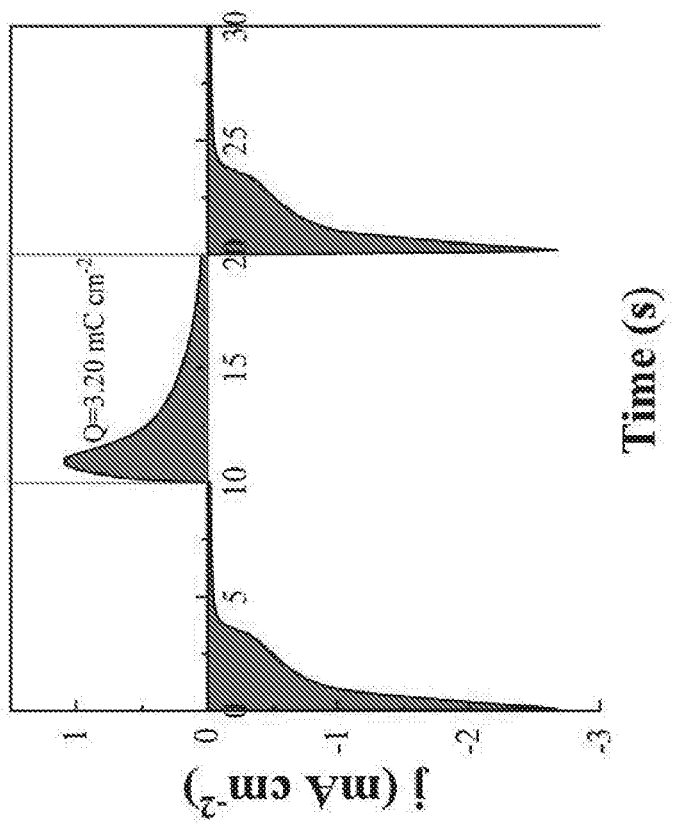
FIGS. 5A-B are graphs illustrating A transmittance and B current change of polymer P4 in 10 s interval steps between 0 and 1.2 V, consistent with exemplary embodiments of the present disclosure.
Figure 5A:
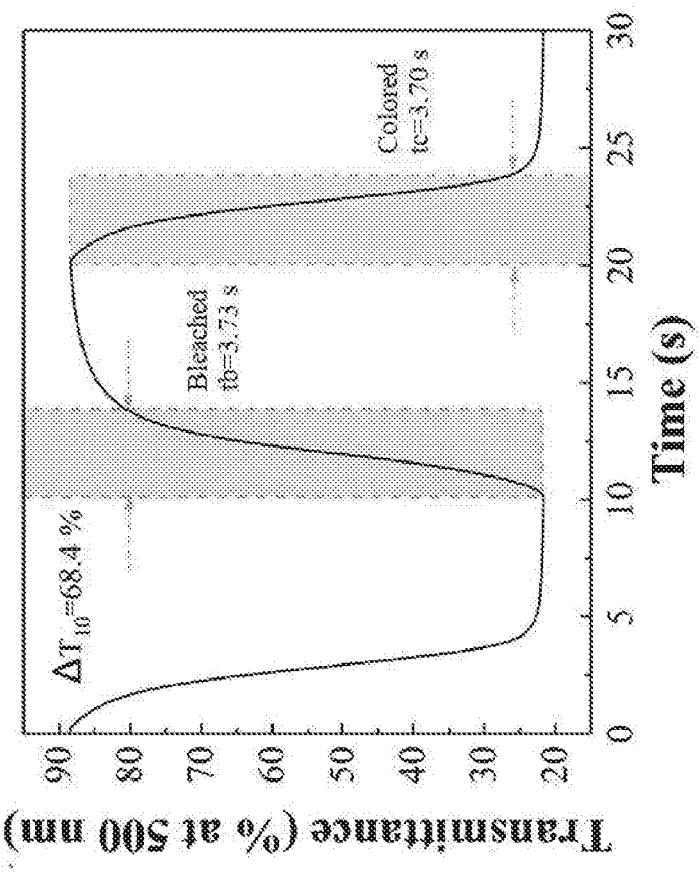

In some embodiments, an interval time of 10 s ($\Delta T_{10}=68.4$) may be chosen to investigate coloration rate and efficiency, as shown in FIGS. 5A-B. The measurements may be performed by a combination of chronoamperometry and an in-situ UV-vis-NIR spectrophotometer via alternating potentials from 0 to 1.2 V. Herein, a response time may be defined as the time required for a 90% change in the full transmittance at 500 nm. In some embodiments, an as-prepared P4 film, the coloration time ($t_c$) may be 3.73 s, and the bleaching time (ti) may be 3.7 s. The fast switching speed may be due to a good connection between an active film (P4) and the OTS-functionalized ITO substrate.

A coloration efficiency (CE, η) is defined as the change in optical density (OD) per unit of inserted charge (Q), which are measured in a simultaneous chronocoulometry and chronoabsorptometry experiment, with the percent transmittance during the switch monitored at the absorbance maxima. Chronocoulometry is used to study kinetics of chemical reactions, diffusion processes, and adsorption. In this technique, a potential step is applied to an electrode and the resulting cumulative charge vs. time is observed. This technique is very similar to Chronoamperometry, except that the integrated charge is recorded in Chronocoulometry instead of raw current. The coloration efficiency can be calculated Based on measurement results, we find that through governing the variation of the merging band with various compositions, a black-to-transmissive electrochromic material with relatively homogenous and broad absorption band can be synthesized. With 1 equivalent of Monomer 1, the feed ratios of Monomers 2, 3 and 4 may range from 0.2-0.6, 0.2-0.45, 0.2-0.35, respectively. The synthesized black material can be realized a tunable color switching from saturated black to transmissive, which are superior to previous reported black-to-transmissive electrochromic materials.

In this disclosure, a method for synthesizing black-to-transmissive electrochromic polymers is disclosed. Black polymers may be developed via controlling a monomer feed ratio in a direct arylation polymerization. Spectroelectrochemistry and colorimetry may exhibit a clear black-to-transmissive upon electrochemical doping. An optimal electrochromic polymer demonstrated high-performance in terms of most broad and uniform visible absorption, a high optical contrast, and long-term redox stability. Hence, this disclosure presents a strategy to design and synthesis electrochromic materials. The high-performance resulting black-to-transmissive polymers can be exploited in privacy glass, optical communication, data storage and some related electrochromic devices.

The disclosure described and claimed herein is not to be limited in scope by the specific preferred embodiments disclosed herein, as these embodiments are intended as illustrations of several aspects of the disclosure. Indeed, various modifications of the disclosure in addition to those shown and described herein will become apparent to those skilled in the art from the foregoing description. Such modifications are also intended to fall within the scope of the appended claims.

What is claimed is:

1. A method for synthesizing a black-to-transmissive electrochromic conjugated polymer, comprising:

contacting Monomer 1, Monomer 2, Monomer 3 and Monomer 4 under an arylation polymerization of about 100° C. to about 200° C. to form the black-to-transmissive electrochromic conjugated polymer, wherein a ratio of Monomer 1:Monomer 2:Monomer 3:Monomer 4 is 1:x:y':z, x+y'+z is about 1, x ranges from about 0.2 to about 0.6, y' ranges from about 0.2 to about 0.45, and z ranges from about 0.2 to about 0.45;

Monomer 1 is of the formula

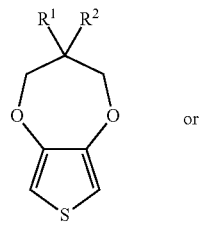

or

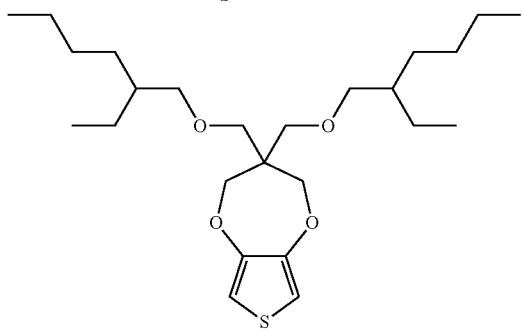

Monomer 2 is of the formula

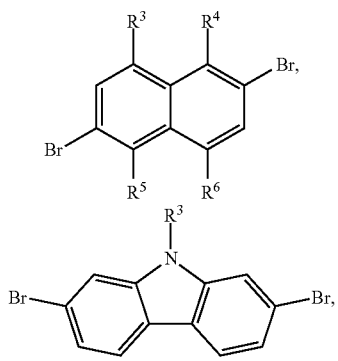

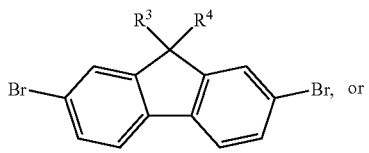

or

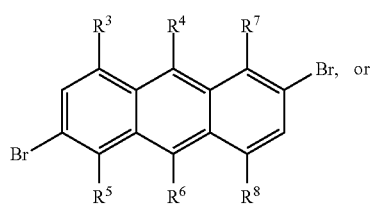

or

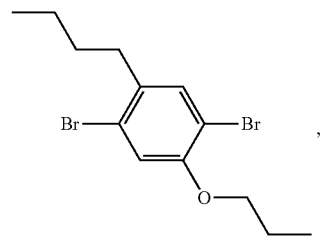

or a combination thereof,

Monomer 3 is of the formula

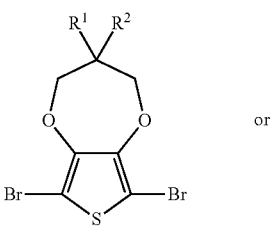

or

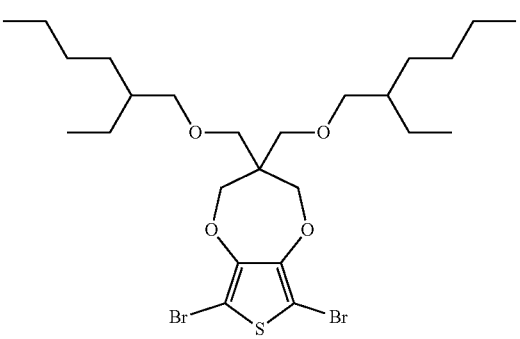

and Monomer 4 is of the formula

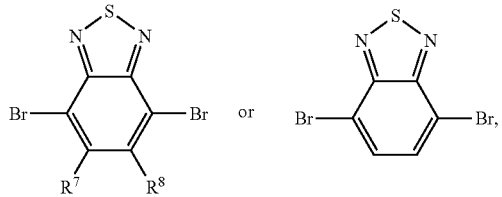

and wherein each of $R^1$, $R^2$, $R^3$, $R^4$, $R^5$, $R^6$, $R^7$, and $R^8$ is independently hydrogen, optionally substituted $C_1$-$C_{30}$ alkyl, optionally substituted $C_2$-$C_{30}$ alkenyl, optionally substituted $C_2$-$C_{30}$ alkynyl, optionally substituted $C_2$-$C_{30}$ alkylcarbonyl, optionally substituted $C_1$-$C_{30}$ alkoxy, optionally substituted $C_3$-$C_{30}$ alkoxyalkyl, optionally substituted $C_2$-$C_{30}$ alkoxycarbonyl, optionally substituted $C_4$-$C_{30}$ alkoxycarbonylalkyl, optionally substituted $C_1$-$C_{30}$ aminylcarbonyl, optionally substituted $C_4$-$C_{30}$ aminylalkyl, optionally substituted $C_1$-$C_{30}$ alkylaminyl, optionally substituted $C_1$-$C_{30}$ alkylsulfonyl, optionally substituted $C_3$-$C_{30}$ alkylsulfonylalkyl, optionally substituted $C_6$-$C_{18}$ aryl, optionally substituted $C_3$-$C_{15}$ cycloalkyl, optionally substituted $C_3$-$C_{30}$ cycloalkylaminyl, optionally substituted $C_5$-$C_{30}$ cycloalkylalkylaminyl, optionally substituted $C_5$-$C_{30}$ cycloalkylalkyl, optionally substituted $C_5$-$C_{30}$ cycloalkylalkyloxy, optionally substituted $C_1$-$C_{12}$ heterocyclyl, optionally substituted $C_1$-$C_{12}$ heterocyclyloxy, optionally substituted $C_3$-$C_{30}$ heterocyclylalkyloxy, optionally substituted $C_1$-$C_{30}$ heterocyclylalkyloxy, optionally substituted $C_1$-$C_{30}$ heterocyclylaminyl, optionally substituted $C_5$-$C_{30}$ heterocyclylalkyl aminyl, optionally substituted $C_2$-$C_{12}$ heterocyclylcarbonyl, optionally substituted $C_3$-$C_{30}$ heterocyclylalkyl, optionally substituted $C_1$-$C_{13}$ heteroaryl, or optionally substituted $C_3$-$C_{30}$ heteroarylalkyl.

2. The method of claim 1, wherein Monomer 1 is of the formula

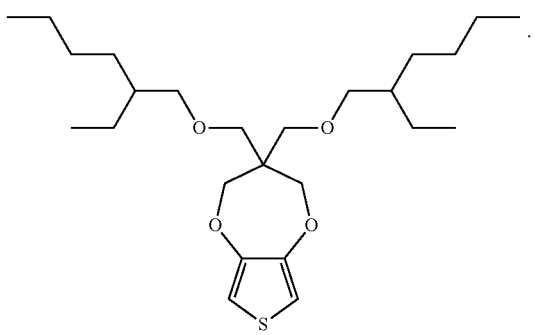 [SMILES: CCCCC(CC)COCC1(COCC(CC)CCCC)COc2cscc2OC1]

3. The method of claim 1, wherein Monomer 2 is of the formula

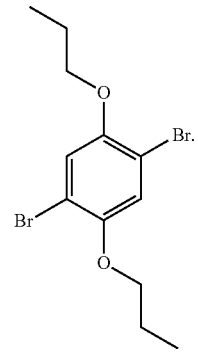 [SMILES: CCCOc1cc(Br)c(OCCC)cc1Br]

4. The method of claim 1, wherein Monomer 3 is of the formula

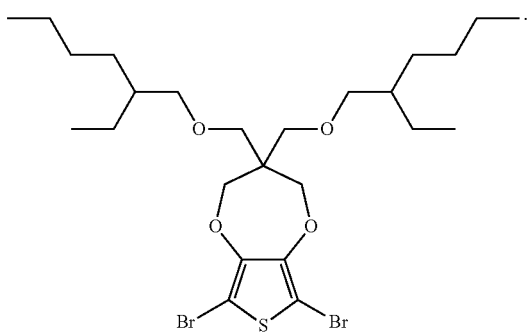 [SMILES: CCCCC(CC)COCC1(COCC(CC)CCCC)COc2c(Br)sc(Br)c2OC1]

5. The method of claim 1, wherein Monomer 4 is of the formula

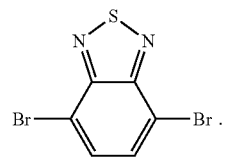 [SMILES: Brc1ccc(Br)c2nsnc12]

6. The method of claim 1, wherein the arylation polymerization comprises using $K_2CO_3$, PivOH, and $Pd(OAc)_2$.

7. The method of claim 1, wherein the arylation polymerization about 2-3 equivalent of $K_2CO_3$, about 0.1-0.5 equivalent of PivOH and about 0.01-0.05 equivalent of $Pd(OAc)_2$ with respect to 1 equivalent of Monomer 1.

8. The method of claim 1, wherein the arylation polymerization comprises about 2.6 equivalent of $K_2CO_3$, about 0.3 equivalent of PivOH and about 0.02 equivalent of $Pd(OAc)_2$ with respect to 1 equivalent of Monomer 1.

9. The method of claim 1, wherein the arylation polymerization further comprises an inert atmosphere and a degassed solvent selected from N-methyl-2-pyrrolidone, N,N-dimethylacetamide, and N,N-dimethylformamide, or a combination thereof.

10. The method of claim 1, further comprising isolating the black-to-transmissive electrochromic polymer, the isolating comprising:

transferring the reaction mixture to a solvent of $CH_3OH$;
transferring the reaction mixture to an aqueous HCl solution;
filtering the reaction mixture to obtain a solid material;
dissolving the solid material in chloroform and washing the solid material with an aqueous HCl solution;
concentrating and precipitating the solid material with $CH_3OH$; and
obtaining the polymer by filtering and drying.

11. The method of claim 1, wherein the electrochromic conjugated polymer has an average molecular weight of about 5.0-100 kDa.

12. The method of claim 1, wherein the electrochromic conjugated polymer has one or more of:
an average molecular weight of about 5.0-100 kDa;
a polydispersity index of 1.2-1.7; and
a low band gap of about 1.61-1.65 eV.

* * * * *